US012578526B2

(12) United States Patent
Cheng

(10) Patent No.: US 12,578,526 B2
(45) Date of Patent: Mar. 17, 2026

(54) COMPACT OPTICAL RESONATOR WITH ENHANCEMENT FEATURES

(71) Applicant: Taiwan Semiconductor Manufacturing Company, Ltd., Hsin-Chu (TW)

(72) Inventor: Wen-Hao Cheng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 336 days.

(21) Appl. No.: 18/324,513

(22) Filed: May 26, 2023

(65) Prior Publication Data

US 2024/0201435 A1      Jun. 20, 2024

Related U.S. Application Data

(60) Provisional application No. 63/476,144, filed on Dec. 19, 2022.

(51) Int. Cl.
| | |
|---|---|
| *G02B 6/293* | (2006.01) |
| *G02B 6/12* | (2006.01) |
| *G02B 6/122* | (2006.01) |

(52) U.S. Cl.
CPC ....... *G02B 6/12002* (2013.01); *G02B 6/1223* (2013.01); *G02B 6/29335* (2013.01); *G02B 6/29338* (2013.01); *G02B 2006/1204* (2013.01); *G02B 2006/12061* (2013.01); *G02B 2006/12078* (2013.01)

(58) Field of Classification Search
CPC .............. G02B 6/2935; G02B 6/29338; G02B 6/28343
See application file for complete search history.

(56) References Cited

U.S. PATENT DOCUMENTS

| | | | | |
|---|---|---|---|---|
| 2015/0301283 A1* | 10/2015 | Bi | ...................... | G02B 6/29398 29/601 |
| 2016/0147014 A1* | 5/2016 | Ptasinski | ................ | G02B 6/125 385/12 |
| 2016/0291251 A1* | 10/2016 | Tu | ...................... | G02B 6/29395 |
| 2016/0322778 A1* | 11/2016 | Pitwon | .............. | G02B 6/12007 |
| 2021/0156687 A1* | 5/2021 | Paniccia | ............. | G01C 19/721 |
| 2022/0075113 A1* | 3/2022 | Zandi | ................... | G01C 19/722 |
| 2022/0221742 A1 | 7/2022 | Roxworthy et al. | | |

FOREIGN PATENT DOCUMENTS

| | | | | | |
|---|---|---|---|---|---|
| CN | 104865639 A | * | 8/2015 | ......... | G02B 6/29334 |
| CN | 110286444 B | | 7/2020 | | |
| CN | 112363272 A | | 2/2021 | | |
| TW | 202210891 A | | 3/2022 | | |

* cited by examiner

*Primary Examiner* — Charlie Y Peng
(74) *Attorney, Agent, or Firm* — HAYNES AND BOONE, LLP

(57) ABSTRACT

The present disclosure provides an embodiment of a photonics structure that includes a ring optical waveguide on a substrate; a rail optical waveguide configured to couple a light into the ring optical waveguide; and enhancement features configured around the ring optical waveguide and the rail optical waveguide to enhance the photonic structure.

20 Claims, 11 Drawing Sheets

COMPACT OPTICAL RESONATOR WITH ENHANCEMENT FEATURES

PRIORITY

This application claims the benefits of U.S. Prov. App. Ser. No. 63/476,144, filed Dec. 19, 2022, the entire disclosure of which is incorporated herein by reference.

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of IC processing and manufacturing, and for these advancements to be realized, similar developments in IC processing and manufacturing are needed. For example, an optical device such as a waveguide or an optical resonator is integrated with other devices into a same substrate or in a same packaging. An optical device is important device in photonic integrated circuit (PIC) and is widely used for various purposes, optical computation, sensing and telecommunication.

Optical resonators have found wide applications in classical optical communication systems. For example, optical resonators are very promising for providing high data rate, ultra-low power consumption, and small footprint (or size) for wavelength division multiplexing (WDM) technology including dense WDM (DWDM) technology in optical communication systems. Recently, optical resonators also found applications in photonic quantum technologies, such as quantum computation. For example, optical resonators may be implemented for filtering or sensing, or as source for providing squeezed light. Squeezed light refers to light in which the electric field strength for some phases has a quantum uncertainty (also referred to as noise) smaller than that of a coherent state. A wide range of applications can benefit from high quality sources of squeezed light. When the IC moves to advanced technology nodes with less feature sizes, an optical device is almost non-shrinkable and cannot be scaled down to small dimensions in the same way as other devices, such as field-effect transistors, due to the characteristics of the optical device. An optical device takes a significant circuit area penalty. Furthermore, the existing structure of an optical device and the method making the optical device introduces defects (such as power loss) into the optical device and causes undesired issues, such as performance, quality and/or reliability issues.

To fully exploit the potential of optical resonators, such as squeezed light in photonic quantum technologies, it is desired for the optical resonators to be scalable, tunable, compatible with existing optical technology. Furthermore, it is desired for the optical resonators to be effective and reliable with reduced power loss and enhanced coupling. Accordingly, there is a need to an optical device structure integrated with other circuit devices and a method of manufacturing thereof absent the disadvantages discussed above, such as further improving optical resonator structures that provide high spectral purity and high optical power efficiency.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
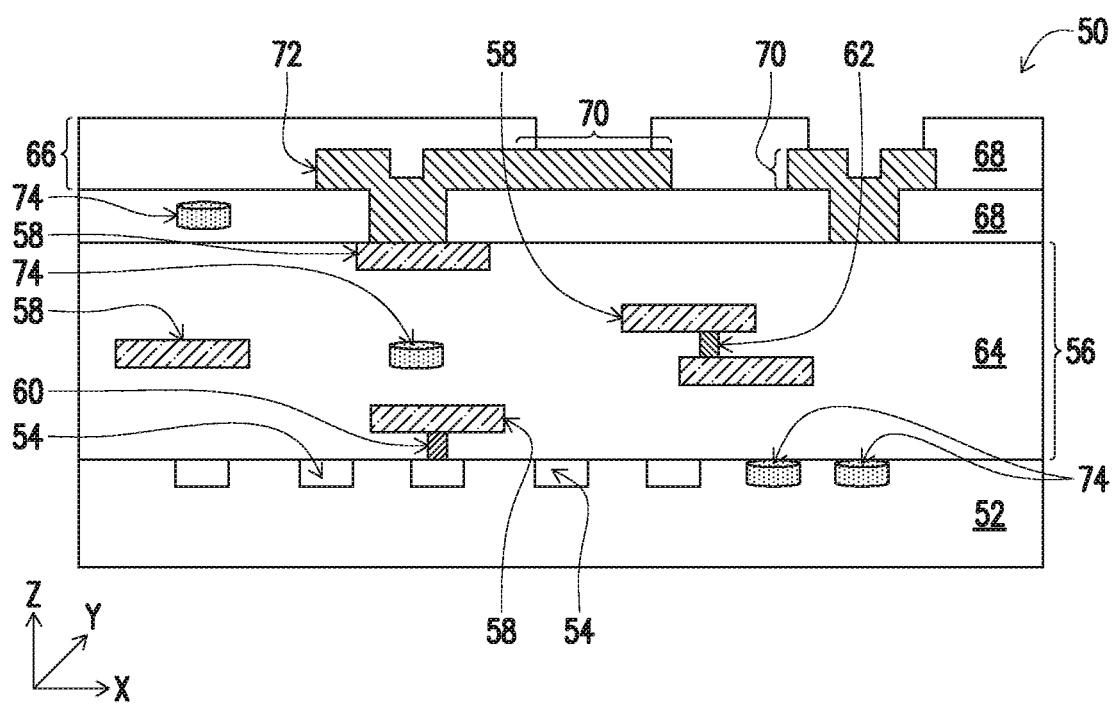
FIG. 1 is a sectional view of an integrated circuit (IC) structure having one or more optical ring resonator (ORR) integrated at various locations, constructed according to some embodiments of the present disclosure.

The following disclosure provides many different embodiments, or examples, for implementing different features. Reference numerals and/or letters may be repeated in the various examples described herein. This repetition is for the purpose of simplicity and clarity and does not in itself dictate a relationship between the various disclosed embodiments and/or configurations. Further, specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. Moreover, the formation of a feature on, connected to, and/or coupled to another feature in the present disclosure may include embodiments in which the features are formed in direct contact, and may also include embodiments in which additional features may be formed interposing the features, such that the features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one feature relationship to another feature. The spatially relative terms are intended to cover different orientations of the device including the features. Still further, when a number or a range of numbers is described with "about," "approximate," and the like, the term is intended to encompass numbers that are within a reasonable range including the number described, such as within +/−10% of the number described, or other values as understood by person skilled in the art. For example, the term "about 5 nm" encompasses the dimension range from 4.5 nm to 5.5 nm.

The present disclosure relates generally to an integrated circuit (IC) structure and a method making the same, and more particularly, to a photonic IC structure that includes an optical resonator integrated with other IC devices such as transistors. In some exemplary embodiments, the photonic circuitry having multiple optical resonators are implemented in generating squeezed light (also referred to as light in a squeezed state) for photonic quantum mechanics, such as quantum computation. The exemplary embodiments of the photonic circuitry provide photon sources with high spectral purity and high optical power efficiency. Meanwhile, the present disclosure is not limited thereto. Various optical communication systems or network technologies based on classical processing units also use both optical components and electronic circuits, and may implement the exemplary embodiments of the photonic circuitry for performance improvement. For example, the exemplary photonic circuitry having multiple optical resonators may be implemented in various optical communication systems, such as in wavelength division multiplexing (WDM) applications.

In the present disclosure, the optical resonator includes one or more optical ring resonator configured and formed on a semiconductor substrate. Particularly, an optical ring resonator (ORR or simply referred to as ring resonator) includes a ring optical waveguide (or simply ring waveguide) and one or two rail optical waveguide (or simply rail waveguide) coupled together. The optical ring resonator function as an optical device for various functions, such as filter, sensor (mechanical, thermo, optical and bio), spectra characterization, telecommunication (multiplexing and switching element in optical network), single photon sources for quantum information experiments, and non-linear responses of the waveguide material allows for frequency modulation processes such as four-wave mixing.

In one example, optical resonators may be implemented as source for providing squeezed light. Squeezed light refers to light in which the electric field strength for some phases has a quantum uncertainty (also referred to as noise) smaller than that of a coherent state.

Quantum mechanics can have many advantages in encoding, transmission, and processing of information. For example, quantum key distribution may be used to achieve high secure communication. Quantum metrology can be used to achieve precision measurements that could not be achieved without using quantum mechanics. In particular, a quantum computer based on quantum mechanical effects can offer exponentially faster computation or higher computation throughput. Certain computational problems, such as the factoring of large numbers, cannot easily be solved using conventional computers due to the time required to complete the computation. It has, however, been shown that quantum computers can use non-classical algorithmic methods to provide efficient solutions to certain of these types of computational problems, among others.

The fundamental unit of quantum information in a quantum computer is called a quantum bit, or qubit. Quantum computers may utilize physical particles to represent or implement a quantum bit. In an electron approach, a "0" or a "1" may be represented by the spin of an electron, where the up or down spin can correspond to "0", "1", or a superposition of states in which the electron's spin is both up and down at the same time. Similarly, in a photonic approach to quantum computing, a "0" may be represented by the possibility of observing a single photon in a given path (or waveguide), whereas the potential for observing the same photon in a different path may represent a "1". Photons are excellent quantum information carriers because they combine high speed with long coherence times at room temperature. Accordingly, one realization in some quantum informatic processing systems is to utilize the quantum observables of a photon to encode information in qubits.

In such photonic-based quantum computing systems, one means for determining an interval in time in which the photon can be located in a particular spatial interval is the implementation of a "heralded" system. A heralded system consists of two photons with a known temporal coincidence window wherein the first photon is referred to as the "signal" photon and the second photon is referred to as the "idler" photon. To ensure that the (signal, idler) photon pair is coincident within a particular pre-determined and temporal coincidence window, particular known physical processes are employed, depending on the system. However, such heralded systems are often quite inefficient. Most architectures for photonic-based heralded quantum computing systems can only make use of a photon pair produced from a source a fraction of the time such a pair is actually produced. As such, the coupling efficiency or optical power efficiency of such quantum circuitry is severely compromised. Most architectures for photonic-based heralded quantum computing systems also suffer from limit quality factors in which spurious light are induced. As such, the spectral purity of such quantum circuitry is often compromised as well. What is desired then, is to increase the optical power efficiency and quality factor of a heralded system in photonic-based quantum circuitry.

To generate (signal, idler) photon pairs, photonic structures having an optical resonator, such as a ring resonator, may be employed. A generic ring resonator consists of an optical waveguide that is looped back on itself, such that a resonance occurs when the optical path length of the resonator is exactly a whole number of wavelengths. Ring resonators therefore support multiple resonances, and the spacing between these resonances, the free spectral range (FSR), depends on the resonator length. By utilizing particular types or configurations of ring resonators in combination with certain photon sources, or couplings of photon sources to the ring resonators, (signal, idler) photon pairs with a differentiating attribute (e.g., wavelength) may be produced. Photonic-based quantum circuitry can then make use of such photon pairs in performing quantum computing.

A first particular physical process that enables heralded systems employs the use of the principle of "spontaneous parametric down conversion" (SPDC). The SPDC process may employ a nonlinear optical material, often a crystal, to effect time coincident generation of a signal photon and corresponding idler photon as products of a nonlinear optical process. SPDC occurs due to the non-zero second-order electric susceptibility term of the dielectric polarization for a non-linear material. SPDC utilizes a single incident photon under phase matching conditions, referred to here as the "pump" photon that is characterized by a frequency, $\omega_{pump}$. The pump photon with frequency, $\omega_{pump}$, is incident to a nonlinear optical material that can spontaneously convert the single pump photon energy into a (signal, idler) pair of temporal coincident photons with each having a frequency of $\omega_{signal}$ and $\omega_{idler}$ respectively wherein $\omega_{pump}=\omega_{signal}+\omega_{idler}$. Because the second-order non-linear effects are nearly instantaneous, the detection of one of the said created pair can herald the generation of the other.

A second particular physical process that enables heralded systems employs the use of the principle of "spontaneous four-wave mixing" (SFWM). The SFWM process may employ a structure that serves as a resonant cavity with a corresponding "quality factor" denoted by Q. SFWM occurs due to the non-zero third-order electric susceptibility term of the dielectric polarization of the cavity material. It is noted that cavities made of isotropic materials (one example is silica glass) have zero-valued second-order terms, thus the non-linear response of such materials is dominated by the non-zero third-order terms. One such resonant cavity structure is the "ring resonator." Within an appropriate structure or medium, SFWM can be regarded as the virtual absorption to two pump photons of frequency $\omega_{1pump}$ and $\omega_{2pump}$ with appropriate phase matching conditions resulting in the spontaneous creation of a (signal, idler) pair. Because the third-order non-linear effects are nearly instantaneous, the detection of one of the said created pair can herald the generation of the other. Due to the mixing relationship, the frequencies of the two pump photons and those of the resulting (signal, idler) pair are related as $\omega_{1pump}+\omega_{2pump}=\omega_{signal}+\omega_{idler}$.

In herald systems it is desirable that the signal and the idler photons have a property that is different between them that allows one to be distinguished from the other, and, further, to route one of the photons differently than the other. One example of such a property is to enable slight deviations in the phase matching criterion resulting in slight predictable deviations in wavelength of the spontaneously generated (signal, idler) pairs as compared to the wavelengths of the two pump photons. The predictable wavelength deviations of a (signal, idler) pair enable the use of SFWM to generate a signal photon at a first wavelength that is time coincident with a idler photon at a second wavelength, wherein the first wavelength of the signal photon differs from the second wavelength of the idler photon.

The disclosed structure includes one or more ORR device. Each ORR device includes one ring waveguide and one or more rail waveguide coupled (directly connected or near-field coupled) together. The ring waveguide is an optical waveguide that is looped back on itself, such that a resonance occurs when the optical path length of the resonator is exactly a whole number of wavelengths. The geometry of the ring waveguide may be in any proper loop shape, such as circular shape, curvilinear ring, race-track ring, any other suitable loop shapes, or a combination thereof. A rail waveguide coupled to the ring waveguide functions as input, output or both. The geometry of the rail waveguide may be in any proper shape, such as a straight line, a curved line, or any other suitable line shape. Furthermore, the optical ring resonator includes an enhancement structure formed surrounding the ring waveguide and the rail waveguides to suppress optical radiation loss, which significantly reduces bending loss, enhance photonics Q-Factor, or enhance quantum squeeze level. Additionally, or alternatively, the enhancement structure may be configured between adjacent optical devices to reduce crosstalk therebetween, therefore functioning as isolator. In various embodiments, the enhancement structure includes one or more enhancement features (or referred to as enhancement lines) configured and designed to effectively reduce radiation losses or reduce the crosstalk, which are described later in details. This also leads to reduction of the device footprint as various waveguides can be disposed more closely (therefore compact) without interference. In term of composition, an enhancement feature is also an optical waveguide. The geometry of the enhancement feature may be in any proper loop shape, such as circular shape, curvilinear ring, race-track ring, any other suitable loop shapes, or a combination thereof. However, an enhancement feature is different from a ring waveguide in various aspects, including function, configuration and dimensions. For example, the enhancement feature is directly connected or near-filed coupled to an adjacent ORR device. A waveguide includes a core feature of a core material surrounded by a cladding layer of a cladding material with a refractive index greater than that of the core material to achieve total internal reflection. The optical ring resonator is integrated in various IC structures, such as those described in FIGS. 1-3 according to various embodiments.

FIG. 1 is a sectional view of an IC structure (also referred to as a photonic structure) 50, constructed in accordance with some embodiments of the present disclosure. The photonic structure 50 includes various optical devices, such as ORR device and integrated with various electrical circuit devices, such as field-effect transistor, and therefore is also referred to as an IC structure. The photonic structure 50 includes a substrate 52, such as a semiconductor substrate. Particularly, the substrate 52 may include a silicon substrate, or other suitable semiconductor substrate. The substrate 52 may alternatively include a compound semiconductor, such as silicon germanium (SiGe), silicon carbide (SiC), gallium arsenic (GaAs), gallium phosphide (GaP), indium phosphide (InP), indium arsenide (InAs), and/or indium antimonide (InSb), or combinations thereof. The substrate 52 may also include a semiconductor-on-insulator substrate, such as Si-on-insulator (SOI), SiGe-on-insulator (SGOI), Ge-on-insulator (GOI) substrates. Portions of the substrate may be doped, such as doped with p-type dopants (e.g., boron (B) or boron fluoride ($BF_3$)), or doped with n-type dopants (e.g., phosphorus (P) or arsenic (As)). The doped portions may also be doped with combinations of p-type and n-type dopants (e.g., to form a p-type well and an adjacent n-type well). The doped portions may be formed directly on the substrate, in a p-well structure, in an n-well structure, in a dual-well structure, or using a raised structure. The substrate 52 includes a frontside surface and a backside surface spanning along X and Y directions with a normal direction along Z direction. The X, Y and Z directions are perpendicular with each other.

The photonic structure 50 includes various devices 54 formed in or on the substrate 52. In various embodiments, the devices 54 include field-effect transistors (FETs), fin field-effect transistors (FinFETs), multi-gate devices, such as gate-all-around (GAA) FETs, other suitable devices (e. g., diodes, capacitors, imaging sensors, memory devices), or a combination thereof.

The photonic structure 50 further includes an interconnect structure 56 disposed on the substrate 52 and coupling the devices 54 into an integrated circuit, such as a digital circuit, memory circuit, analog circuit, or a combination thereof. The interconnect structure 56 includes various conductive features, such as metal lines 58 distributed in multiple metal layers to provide horizontal routing; contacts 60 configured between the substrate 52 and the interconnect structure 56 to provide vertical routing therebetween; and vias 62 configured between metal layers to provide vertical routing between adjacent metal layers. Various conductive features of the interconnect structure 56 are embedded in one or more interlayer dielectric (ILD) layer 64 to provide isolation.

The photonic structure 50 further includes a passivation structure 66 disposed on the interconnect structure 56 to provide passivation function to various devices (including devices 54) and the interconnect structure 56. The passivation structure 66 may further include other functions, such as redistribution layer (RDL) and bonding structure. Particularly, the passivation structure 66 includes one or more passivation layer 68, such as silicon nitride, silicon oxide, other suitable dielectric material, or a combination thereof. The passivation structure 66 further includes one or more bond pad 70 exposed within the openings of the passivation layer 68. The passivation structure 66 may further include a RDL 72 to redistribute the bond pads 70 to different locations. The RDL 72 is conductive feature to electrically connect the bond pad 70 to a metal line, such as a metal line in the top metal layer of the multiple metal layers in the interconnect structure 56.

The photonic structure 50 further includes one or more optical devices, such as an optical ring resonator 74 formed on the substrate 52 and integrated with other devices 54. In various embodiment, the optical ring resonator 74 is formed in the substrate 52, in the interconnect structure 56, in the passivation structure 66, or a combination thereof, such as those illustrated in FIG. 1.

In the present disclosure, the optical ring resonator 74 includes a ring waveguide, and one or two rail waveguides coupled together. The ring resonator is designed for optical function such as filtering, sensing, spectra characterization, telecommunication and etc. The rail waveguides function as input, output or both. Furthermore, the optical ring resonator 74 includes an enhancement structure formed surrounding the ring waveguide and the rail waveguides to suppress optical radiation loss to reduce bending loss, enhance photonics Q-Factor, and enhance quantum squeeze level, and/or reduce crosstalk between adjacent optical devices. More generally, the optical device 74 described here may include one optical ring resonator or multiple optical ring resonators with respective configurations, such as those illustrated in FIGS. 5A through 12, to be described in detail below according to various embodiments.

Figure 2:
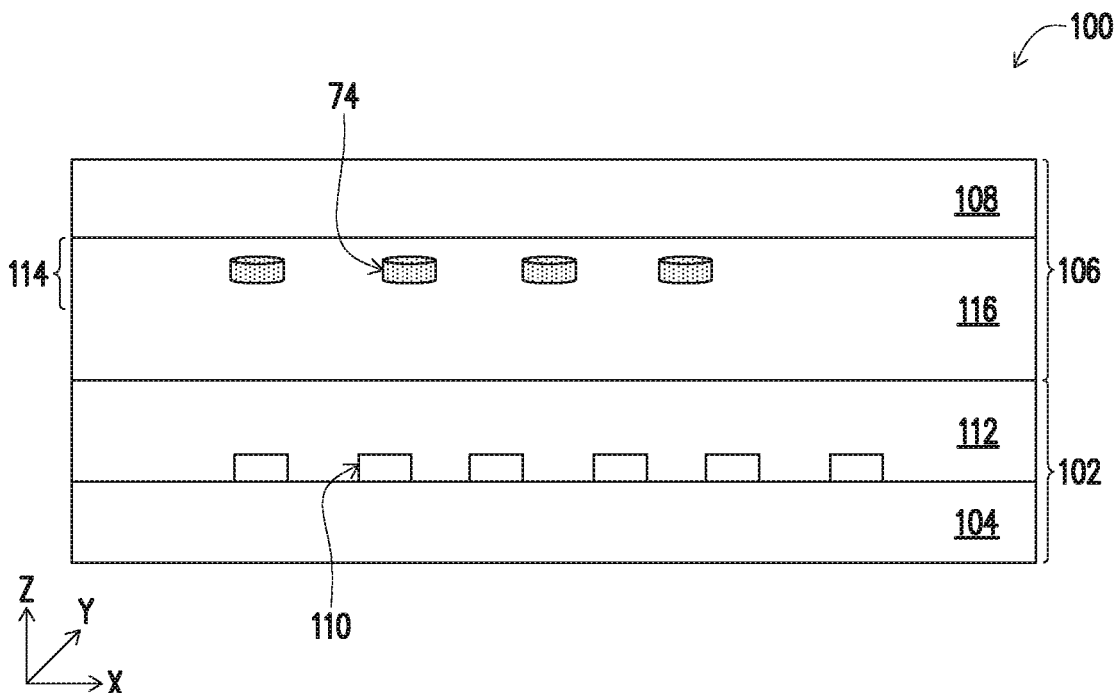
FIG. 2 is a sectional view of an IC structure having one or more ORR, constructed according to some embodiments of the present disclosure.

FIG. 2 is a sectional view of an IC structure (or a photonic structure) 100, constructed in accordance with some embodiments of the present disclosure. The photonic structure 100 includes a first circuit structure 102 formed on a first substrate 104 and a second circuit structure 106 formed on a second substrate 108. The first circuit structure 102 and the second circuit structure 106 are bonded together to form a three-dimensional (3D) IC structure, by a suitable bonding technology, such as wafer level packaging, wafer chip-scale packaging, or fan out wafer-level package technology. The first circuit structure 102 and the second circuit structure 106 are electrically coupled into an integrated circuit by a suitable technology, such as hybrid bonding layer, through-semiconductor via (TSV), other suitable coupling technologies, or a combination thereof.

Particularly, each substrate (first substrate 104 or the second substrate 108) may include a semiconductor substrate, such as a silicon substrate or alternatively a compound semiconductor, similar to the substrate 52 described above. Each substrate may also include a semiconductor-on-insulator substrate, such as SOI, SGOI, or GOI substrates. Portions of the substrate may be further doped or modified according to individual applications.

The first and second substrates 104 and 108 each include a frontside surface and a backside surface spanning along X and Y directions with a normal direction along Z direction. The X, Y and Z directions are perpendicular with each other. In various embodiments, the first circuit structure 102 and the second circuit structure 106 are bonded together through the frontside surface of the first substrate 104 to the frontside surface of the second substrate 108, the frontside surface of the first substrate 104 to the backside surface of the second substrate 108, hybrid bonding layer, an interposer, or other configurations, depending on individual applications.

The first circuit structure 102 includes various devices 110 formed on the first substrate 104. The devices 110 include FETs, FinFETs, GAA devices, other multi-gate devices, complementary field-effect transistor (CFET) structure, or a combination thereof. The first circuit structure 102 further includes an interconnect structure 112 coupling the devices 110 into a first circuit, such as a digital circuit, memory circuit, analog circuit, or a combination thereof.

The second circuit structure 106 includes various devices 114 formed on the second substrate 108. The devices 114 may include various devices, such as high-frequency devices, imaging sensor circuit, passive devices (e.g., capacitors and inductors), micro-electromechanical systems (MEMS) devices, or a combination thereof. The second circuit structure 106 further includes an interconnect structure 116 coupling the devices 114 into a second circuit, which is coupled with the first circuit formed on the first substrate 104. Particularly, the devices 114 formed in the second circuit structure 106 include one or more optical ring resonator 74 coupled and integrated with other devices 110 formed on the first substrate 104.

Figure 3:
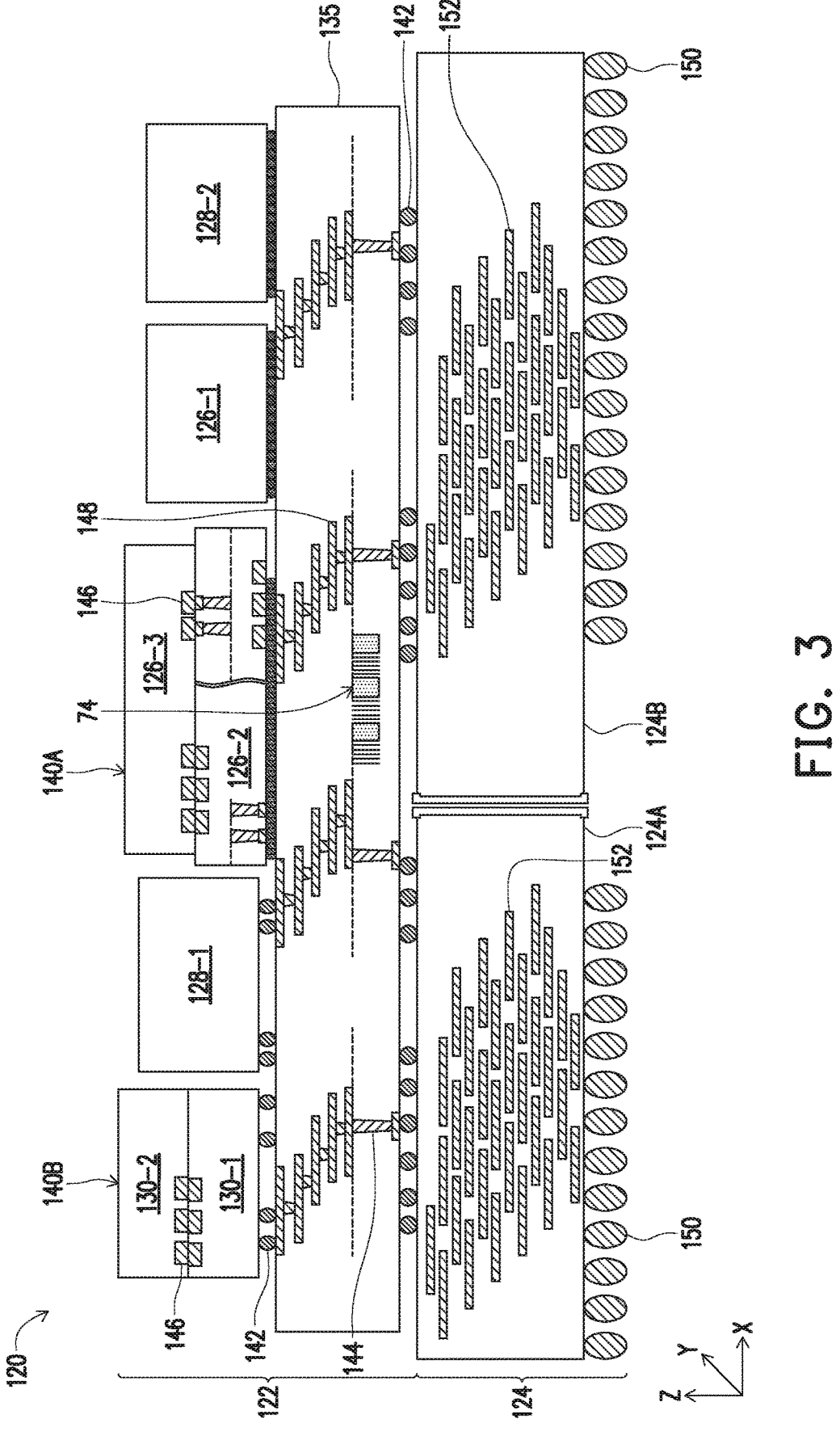
FIG. 3 is a sectional view of an IC structure having one or more ORR integrated therein, constructed according to some embodiments of the present disclosure.

FIG. 3 is a fragmentary cross-sectional view of the IC structure 120, in portion or entirety, that is provided by arranging a chipset using a combination of multichip packaging technologies, such as chip-on-wafer-on-substrate (CoWoS) packaging technology, system-on-integrated-chips (SoIC) multi-chip packaging technology, an integrated-fan-out (InFO) package, according to various aspects of the present disclosure. The IC structure 120, which can be referred to as a 3D IC package and/or a 3D IC module, includes a CoW structure 122 attached to a substrate 124 (e.g., a package substrate), which includes a package component 124A and a package component 124B in the depicted embodiment. CoW structure 122 includes a chipset (e.g., a core chip 126-1, a core chip 126-2, a core chip 126-3, a memory chip 128-1, a memory chip 128-2, an input/output (I/O) chip 130-1, and an I/O chip 130-2 electrically connected to each other) attached to an interposer 135. The chipset is arranged into at least one chip stack, such as a chip stack 140A and a chip stack 140B. Chip stack 140A includes core chip 126-2 and core chip 126-3, and chip stack 140B includes I/O chip 130-1 and I/O chip 130-2. In the depicted embodiment, chips of chip stack 140A and chip stack 140B are directly bonded face-to-face and/or face-to-back to provide SoIC packages of multichip package. In some embodiments, a chip stack of multichip package includes a combination of chip types, such as a core chip having one or more memory chips disposed thereover. FIG. 3 has been simplified for the sake of clarity to better understand the inventive concepts of the present disclosure. Additional features can be added in multichip package, and some of the features described below can be replaced, modified, or eliminated in other embodiments of multichip package.

Core chip 126-1, core chip 126-2, and core chip 126-3 are central processing unit (CPU) chips and/or other chips. In some embodiments, core chip 126-1 is a CPU chip that forms at least a portion of CPU cluster, and core chip 126-2 and core chip 126-3 are GPU chips. In some embodiments, core chip 126-1, core chip 126-2, core chip 126-3, or combinations thereof represent a stack of CPU dies, which can be bonded and/or encapsulated in a manner that provides a CPU package and/or a CPU-based SoIC package. In some embodiments, core chip 126-1, core chip 126-2, core chip 126-3, or combinations thereof represent a stack of dies, which can be bonded and/or encapsulated in a manner that provides a GPU package and/or a SoIC package (e.g., a GPU-based SoIC package). In some embodiments, core chip 126-1, core chip 126-2, core chip 126-3, or combinations thereof represent a stack of CPU dies, which can be bonded and/or encapsulated in a manner that provides a core package and/or a core-based SoIC package. In some embodiments, core chip 126-1, core chip 126-2, core chip 126-3, or combinations thereof are SoCs.

Memory chip 128-1 and memory chip 128-2 are high bandwidth memory (HBM) chips, GDDR memory chips, dynamic random-access memory (DRAM) chips, static random-access memory (SRAM) chips, magneto-resistive random-access memory (MRAM) chips, resistive random-access memory (RRAM) chips, other suitable memory chips, or combinations thereof. In some embodiments, memory chip 128-1 and memory chip 128-2 are HBM chips that form at least a portion of the memory device. In some embodiments, memory chip 128-1 and memory chip 128-2 are a graphics double-data rate (GDDR) memory chips that form at least a portion of the memory device. In some embodiments, memory chip 128-1 is an HBM chip and memory chip 128-2 is a GDDR memory chip, or vice versa, that form at least a portion of the memory device. In some embodiments, memory chip 128-1 and/or memory chip 128-2 represent a stack of memory dies, which can be bonded and/or encapsulated in a manner that provides a memory package and/or a memory-based SoIC package. The memory package may be an HBM package (also referred to as an HBM cube) or a GDDR memory package.

Core chip 126-1, core chip 126-2 (and thus chip stack 140A), memory chip 128-1, memory chip 128-2, and I/O chip 130-1 (and thus chip stack 140B) are attached and/or interconnected to interposer 135. Interposer 135 is attached and/or interconnected to substrate 124. Various bonding mechanisms can be implemented in multichip package, such as electrically conductive bumps 142 (e.g., metal bumps), through semiconductor vias (TSVs) 144, bonding pads 146, or combinations thereof. For example, electrically conductive bumps 142 physically and/or electrically connect core chip 126-1, core chip 126-2 (and thus chip stack 140A), memory chip 128-1, memory chip 128-2, and I/O chip 130-1 (and thus chip stack 140B) to interposer 135. Electrically conductive bumps 142 and TSVs 144 physically and/or electrically connect interposer 135 to substrate 124. TSVs 144 of interposer 135 are electrically connected to electrically conductive bumps 142 of chips and/or chip stacks of CoW structure 122 through electrically conductive routing structures (paths) 148 of interposer 135. Bonding pads 146 physically and/or electrically connect core chip 126-2 and core chip 126-3 of chip stack 140A and I/O chip 130-1 and I/O chip 130-2 of chip stack 140B. Also, dielectric bonding layers adjacent to bonding pads 146 can physically and/or electrically connect core chip 126-2 and core chip 126-3 of chip stack 140A and/or I/O chip 130-1 and I/O chip 130-2 of chip stack 140B. In some embodiments, electrically conductive bumps 142 that connect chips and/or chip stacks to interposer 135 may be microbumps, while electrically conductive bumps 142 that connect interposer 135 to substrate 124 may be controlled collapse chip connections (referred to as C4 bonds) (e.g., solder bumps and/or solder balls).

In some embodiments, substrate 124 is a package substrate, such as coreless substrate or a substrate with a core, that may be physically and/or electrically connected to another component by electrical connectors 150. Electrical connectors 150 are electrically connected to electrically conductive bumps 142 of interposer 135 through electrically conductive routing structures (paths) 152 of substrate 124. In some embodiments, package component 124A and package component 124B are portions of a single package substrate. In some embodiments, package component 124A and package component 124B are separate package substrates arranged side-by-side. In some embodiments, substrate 124 is an interposer. In some embodiments, substrate 124 is a printed circuit board (PCB).

In some embodiments, interposer 135 is a semiconductor substrate, such as a silicon wafer (which may generally be referred to as a silicon interposer). In some embodiments, interposer 135 is laminate substrate, a cored package substrate, a coreless package substrate, or the like. In some embodiments, interposer 135 can include an organic dielectric material, such as a polymer, which may include polyimide, polybenzoxazole (PBO), benzocyclobutene (BCB), other suitable polymer-based material, or combinations thereof. In some embodiments, redistribution lines (layers) (RDLs) can be formed in interposer 135, such as within the organic dielectric material(s) of interposer 135. RDLs may form a portion of electrically conductive routing structures 148 of interposer 135. In some embodiments, RDLs electrically connect bond pads on one side of interposer 135 (e.g., top side of interposer 135 having chipset attached thereto) to bond pads on another side of interposer 135 (e.g., bottom side of interposer 135 attached to substrate 124). In some embodiments, RDLs electrically connect bond pads on the top side of interposer 135, which may electrically connect chips of the chipset. In the disclosed embodiment, one or more ORR 74 may be embedded in interposer 135, other suitable locations or a combination thereof.

In some embodiments, multichip package can be configured as a 2.5D IC package and/or a 2.5D IC module by rearranging the chipset, such that each chip is bonded and/or attached to interposer 135. In other words, the 2.5D IC module does not include a chip stack, such as chip stack 140A and chip stack 140B, and chips of the chipset are arranged in a single plane. In such embodiments, core chip 126-3 and I/O chip 130-2 are electrically and/or physically connected to interposer by electrically conductive bumps 142.

The IC structure (such as structure 50, 100 or 120) may further include other devices, components, function units integrated with the ORR(s) 74 to form a functional module such that the corresponding ORR(s) 74 can perform its desired functions. For example, the ORR(s) 74 are portions of a photonics quantum squeezer. In another example, the ORR(s) 74 are portions of a telecommunication module. The IC structure further includes other function units or modules integrated with the ORR device(s) 74, such as one illustrated in FIG. 4.

Figure 4:
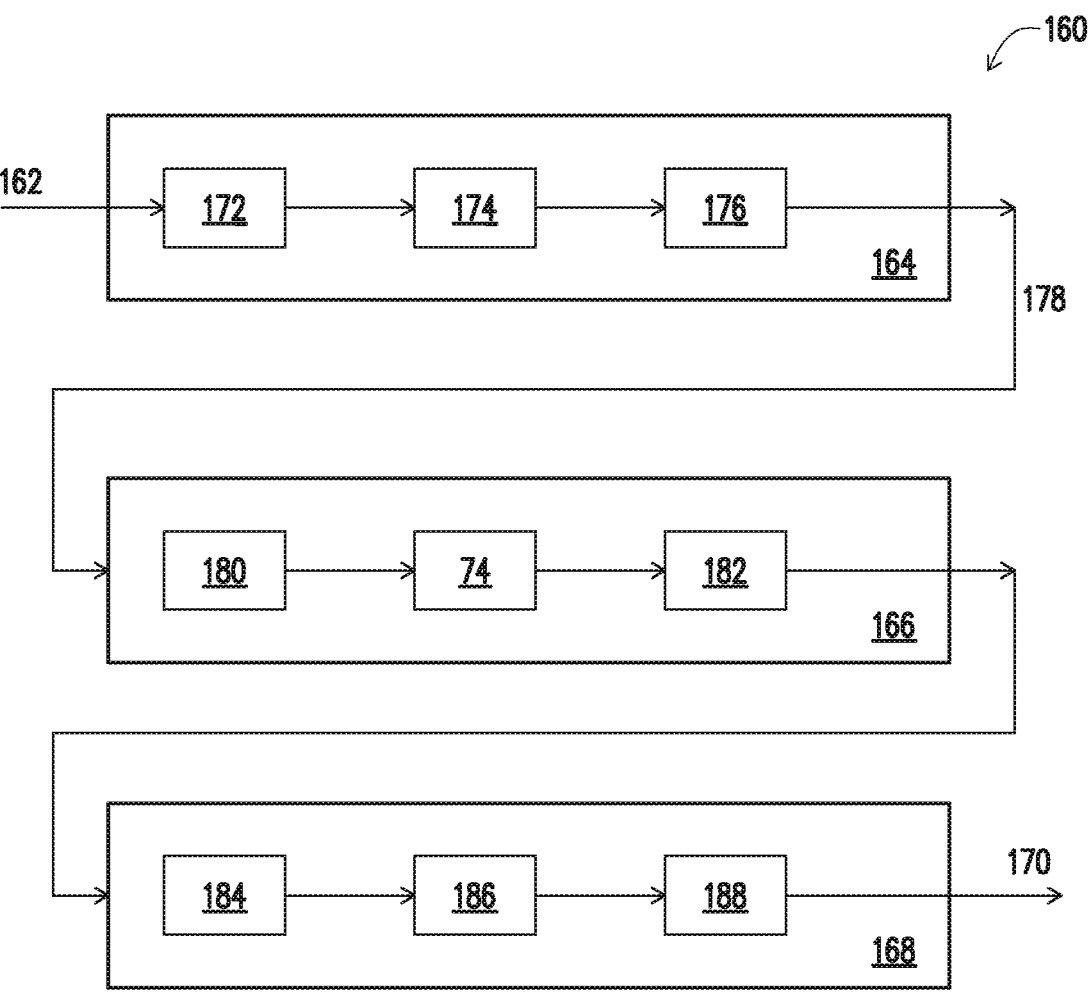
FIG. 4 is a block diagram of a photonic structure having one or more ORR integrated therein, constructed according to some embodiments of the present disclosure.

FIG. 4 is a block diagram of a communication system 160, in portion or entirety, constructed in accordance with some embodiments of the present disclosure. Particularly, the communication system 160 includes an optical module including one or more ORR device integrated with other circuit modules on a substrate (such as the substrate 52 or 104) and designed for proper applications, such as telecommunication application. In various embodiments, various components, features and modules of the communication system 160 may be distributed in one or more semiconductor substrates, other suitable substrates, stand-alone modules (such as optical modules, printed circuit boards and/or other suitable modules) integrated and coupled together as a functional communication system. In the disclosed embodiments, the communication system 160 includes a message origin 162, a transmitter 164, a processing module 166, and a receiver 168 configured so the message origin 162 is transformed and processed sequentially to generate the message output 170.

The message origin 162 may include a transducer that converts a nonelectrical message to an electrical signal. In various examples, the transducer takes any suitable proper physical form, such as a microphone that coverts sound waves into currents, or a video camera that converts images into currents. In some examples, the message origin 162 may include data transfer between computers.

In some embodiments, the transmitter 164 includes a modulator 172 to receive the message origin 162. The modulator 172 includes one or more function, such as converting the electrical message into a proper format (e.g., analog or digital) and impressing this signal onto the wave generated by the source carrier 174. The source carrier 174 generates the wave (also referred to carrier) on which the information is transmitted. In some examples, the carrier is produced by an electronic oscillator in radio frequency communication system. In other examples for fiber optic system, a laser diode or a light-emitting diode is used as the carrier source.

The transmitter 164 may further include a channel coupler 176, which feed power into the information channel 178. In some examples with integrated optics, the channel coupler 176 may include a lens for collimating the light emitted by the carrier source and directing the light toward the receiver. The information channel 178 refers to the path between the transmitter 164 and the receiver 168.

The processing module 166 includes one or more units, devices and components to process the information, such as optical amplifier 180, one or more optical ring resonator 74, another optical amplifier 182.

The information transmitted from the processing module 166 is sent to the receiver 168. In some embodiments, the receiver 168 includes a detector 184, an amplifier 186, a signal processing unit 188, and other optical units.

Figure 5A:
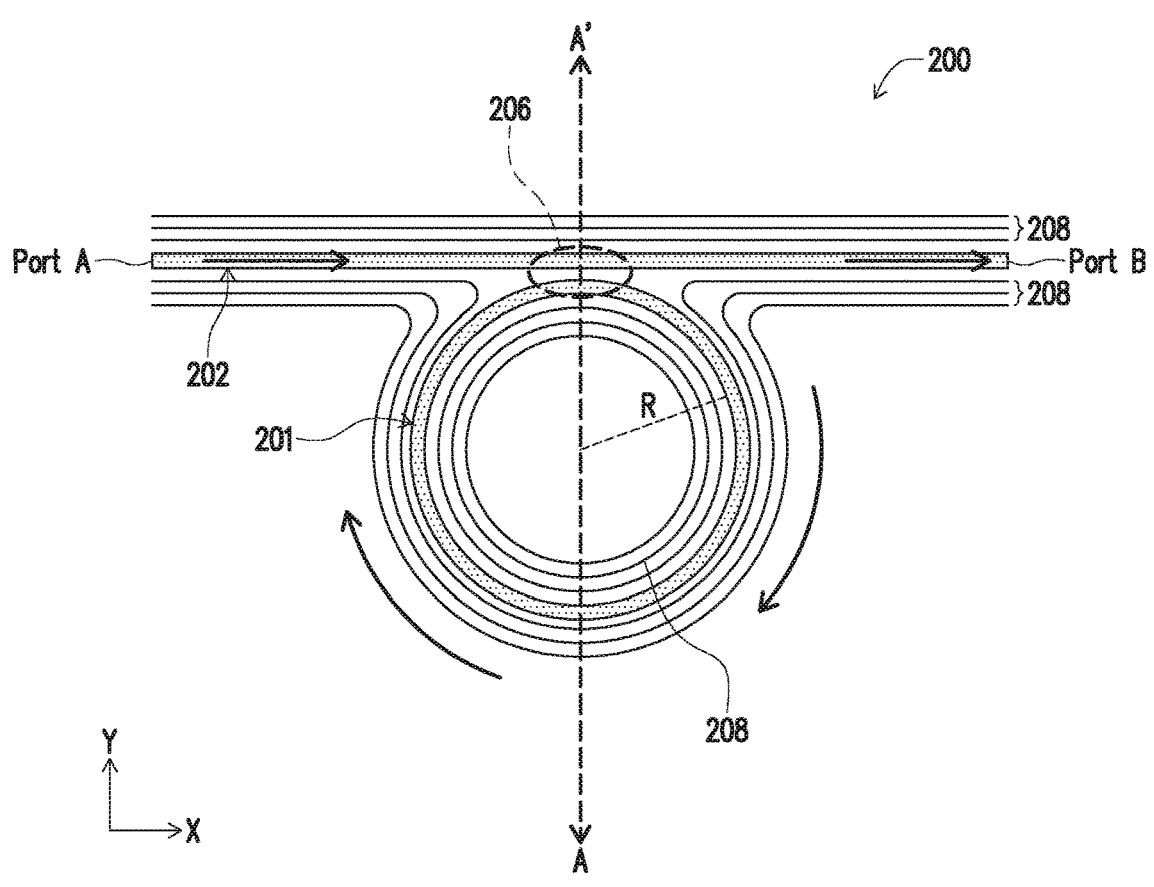
FIGS. 5A and 5B illustrate a top view and a sectional view, respectively, of a photonic structure, constructed according to some embodiments of the present disclosure.
Figure 5B:
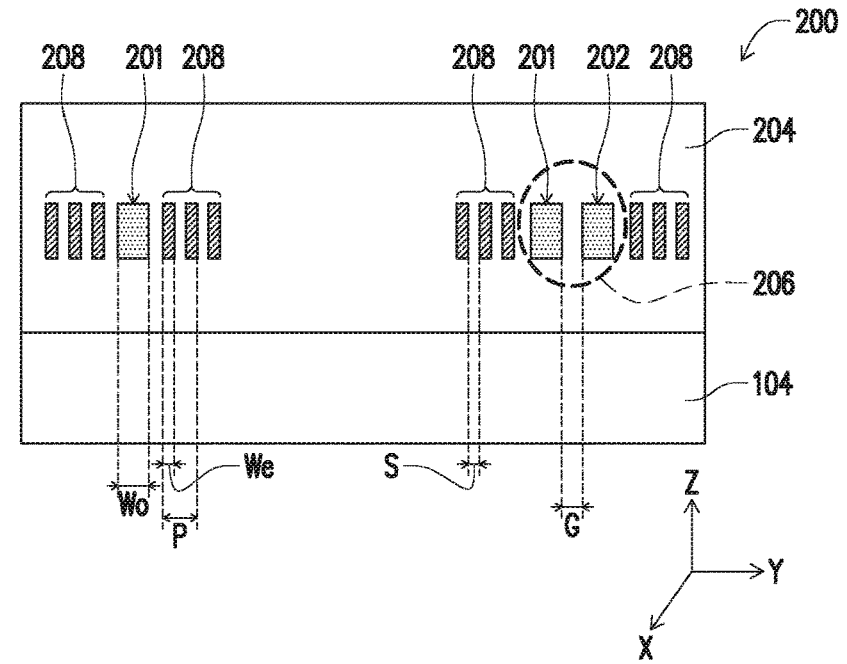

FIG. 5A is a top view of an exemplary photonic structure (or photonic circuit or photonic integrated circuit) 200 that includes an ORR (device). The ORR further includes a ring optical waveguide 201 and a rail optical waveguide 202 (or referred to as bus optical waveguide) in the form of a single rail, and FIG. 5B is a cross-sectional view of the photonic structure 200 along AA', constructed in accordance with some embodiments. The ring optical waveguide 201 can be considered as a type of optical waveguide in the form of a ring.

The ring optical waveguide 201 and the rail optical waveguide 202 each may include a core surrounded by a cladding layer 204 with a refractive index less than that of the corresponding core to achieve total internal reflection. The core material includes a suitable material, such as silicon, non-linear optical material, such as silicon nitride or other suitable material including silicon nitride (SiN), lithium niobate (LiNbO$_3$), aluminium gallium arsenide (AlGaAs), Indium phosphide (InP), aluminum nitride (AlN), or a combination thereof, surrounded by the cladding layer 204 (such as silicon dioxide) that is disposed over a semiconductor substrate 104 (such as a silicon substrate). Further, the ring optical waveguide 201 and the rail optical waveguide 202 may have different material compositions. In some embodiments, the core material may use other suitable materials, such as fluid used in the rail optical waveguide 202 and the ring optical waveguide 201. In furtherance of the embodiments, the fluid used as the core for the ring optical waveguide 201 and the rail optical waveguide may be further integrated with microfluid mechanism for various applications, such as sensing and characterization of the fluid. In this case, the fluid as the core may also be used as a chemical to be tested, measured and characterized. Alternatively, the fluid may be used as a tunable core composition for other applications, in which the refractive index can be tuned with composition of the chemicals in the fluid.

The ORR device includes a waveguide loop (the ring optical waveguide 201) such that a resonance for photons having a certain wavelength may occur when the optical path length of the optical ring resonator is an integer number of the wavelength of the photons. The ORR may support multiple resonances at multiple wavelengths that may meet the resonance condition. A single-ring ring resonator satisfies $2\pi r n_{eff} = m\lambda$ and multiple-ring ring resonator satisfies $2\pi r N n_{eff} = m\lambda$, in which $n_{eff}$ is the refractive index of the core, and N and m are integers. The spacing between these resonances in spectra may be referred to as the free spectral range (FSR) and may depend on the optical path length of the ORR. In some embodiments, the ring optical waveguide 201 may have a radius R ranging between 1 μm and 10,000 μm—and is also referred to as a micro-ring resonator. The terms "ring resonator", "optical ring resonator" and "micro-ring resonator" are used interchangeable in the present disclosure. The radius of the ring optical waveguide 201 depends on individual applications. For examples, when the ring optical waveguide 201 is used in telecommunication, such as in O-band (λ: 1310 nm) or C-band (λ: 1550 nm), the radius R is determined by the corresponding wavelength λ. In various embodiments, the ring optical waveguide 201 may include any proper geometry in a ring shape, such as circular ring, curvilinear, race-track, or any other ring shape.

Photon source(s) provides photons to the rail optical waveguide 202 though an input port, denoted as Port A. The photons propagate in the direction towards an output port of the rail optical waveguide 202, denoted as Port B. Photons traveling through one rail optical waveguide 202 are coupled into an adjacent ring optical waveguide 201. This phenomenon is referred to as evanescent coupling. As photons propagates through the rail optical waveguide 202, a fraction will be coupled into the ring optical waveguide 201. To increase the fraction of photons coupled into the ring optical waveguide 201 and accordingly to increase the coupling efficiency, the ring optical waveguide 201 is closely positioned to the rail optical waveguide 202 to enhance the evanescent coupling. Thus, such evanescent coupling is also referred to as near-field coupling.

A region is indicated as near-field coupling region 206 that is representative of the portion of the photonic structure 200 where near-field coupling occurs between the ring optical waveguide 201 and the rail optical waveguide 202. A fraction of the photons coupled from the rail optical waveguide 202 propagate into the ring optical waveguide 201, and a remaining fraction of the photons continue to propagate in the rail optical waveguide 202 and exit the rail optical waveguide 202 from Port B. Of the fraction of the photons that are coupled into the ring optical waveguide 201, some further fraction undergoes a spontaneous physical process. For example, spontaneous four wave mixing (SFWM) or spontaneous parametric down-conversion (SPDC) process may occur in the ring optical waveguide 201. In an SFWM process, two pump photons may be converted into a pair of daughter photons (e.g., signal and idler photons) in the nonlinear optical material. Due to energy conservation, the signal and idler photons generated may be at frequencies that are symmetrically distributed around the pump frequency. In general, due to such a spectral correlation, the heralded photons may be in a mixed state. The signal and idler photon generated within the ring optical waveguide 201 may be coupled out of the ring optical waveguide 201 and back to the rail optical waveguide 202 and exit towards the Port B, which occur in the near-field coupling region 206 at a certain coupling efficiency.

However, there are still fractions of the photons in the ring optical waveguide 201 and the rail optical waveguide 202 that may propagate into other space as loss of the signal power. The disclosed structure of the photonic structure 200 further includes enhancement features (or simply referred to as enhancement lines) 208 configured around the ring optical waveguide 201 and the rail optical waveguide 202, and designed to suppress such energy loss and enhance the performance of the photonic structure 200. The enhancement lines 208 may include multiple layers, such as 2~5 layers. In FIGS. 5A and 5B, the photonic structure 200 illustrates three layers of the enhancement features 208. In some embodiments, the multiple layers of the enhancement features 208 are periodically configured around the active optical devices (such as 201 and 202). Particularly, the near-field coupling region 206 between the ring optical waveguide 201 and the rail optical waveguide 202 are free of the enhancement features 208 since this region is intended for the coupling therebetween.

The enhancement features 208 are similar to the ring optical waveguide 201 and the rail optical waveguide 202 in composition but designed with configuration to enhance the performance of the photonic structure 200. Especially, the enhancement features 208 are passive optical features and are not connected to any optical signal or power. Instead, each of those enhancement features 208 stands alone and is configured around active optical devices (such as the ring optical waveguide 201 and the rail optical waveguide 202) to assist the active photonic devices and enhance the performance thereof. The proper configuration of the enhancement features 208 can increase the effectiveness of enhancement functions including suppressing power loss (as illustrated in the photonic structure 200 in FIGS. 5A and 5B) and isolating active photonic devices to reduce crosstalk (such as illustrated in the photonic structure 250 in FIG. 6).

Various dimensions of the configuration of the enhancement features 208 are described in detail according to various embodiments. Those dimensions are related to the working wavelength λ of the photons in the ring optical waveguide 201 and the optical waveguide 202. For example, when the optical signal of the photons in some telecommunication applications is in C-band, the working wavelength λ is 1550 nm. The line width of the enhancement features 208 is We; the line spacing of the enhancement features 208 is S; and the pitch of the enhancement features 208 is P, wherein $P=W_e+S$. In the disclosed embodiments, P ranges between 0.06λ and 0.12λ; We ranges between 0.03λ and 0.09λ; and S ranges between 0.03λ and 0.05λ. In the example wherein the working wavelength λ=1550 nm, P ranges between about 100 nm and about 200 nm; $W_e$ ranges between about 40 nm and about 140 nm; and S ranges between about 50 nm and about 80 nm. In furtherance of the embodiments, the ratio $W_e/P$ ranges between 0.4 and 0.7 and $S=P-W_e$.

Furthermore, the width $W_o$ of the ring optical waveguide 201 and the rail optical waveguide 202 ranges between 0.22 and 22; and the gap G between the active optical devices (such as between the ring optical waveguide 201 and the rail optical waveguide 202) ranges between 0.22 and 0.62. In some embodiments, the ratio $W_o/W_e$ ranges between about 6 and 25; the ratio $G/W_e$ ranges between about 5 and 9; and the ratio $W_o/P$ ranges between about 3 and 16.

The enhancement features 208 includes a first subset disposed inside the ring optical waveguide 201, a second subset disposed outside of the ring optical waveguide 201 and extended to a first edge of the rail optical waveguide 202, and a third subset disposed on a second edge of the rail optical waveguide 202. The second edge is opposing the first edge. Each subset of the enhancement features 208 includes a number N of enhancement features, and N may range between 1 and 5 according to some embodiments. In the disclosed embodiment illustrated in FIGS. 5A and 5B, N is 3.

Figure 6:
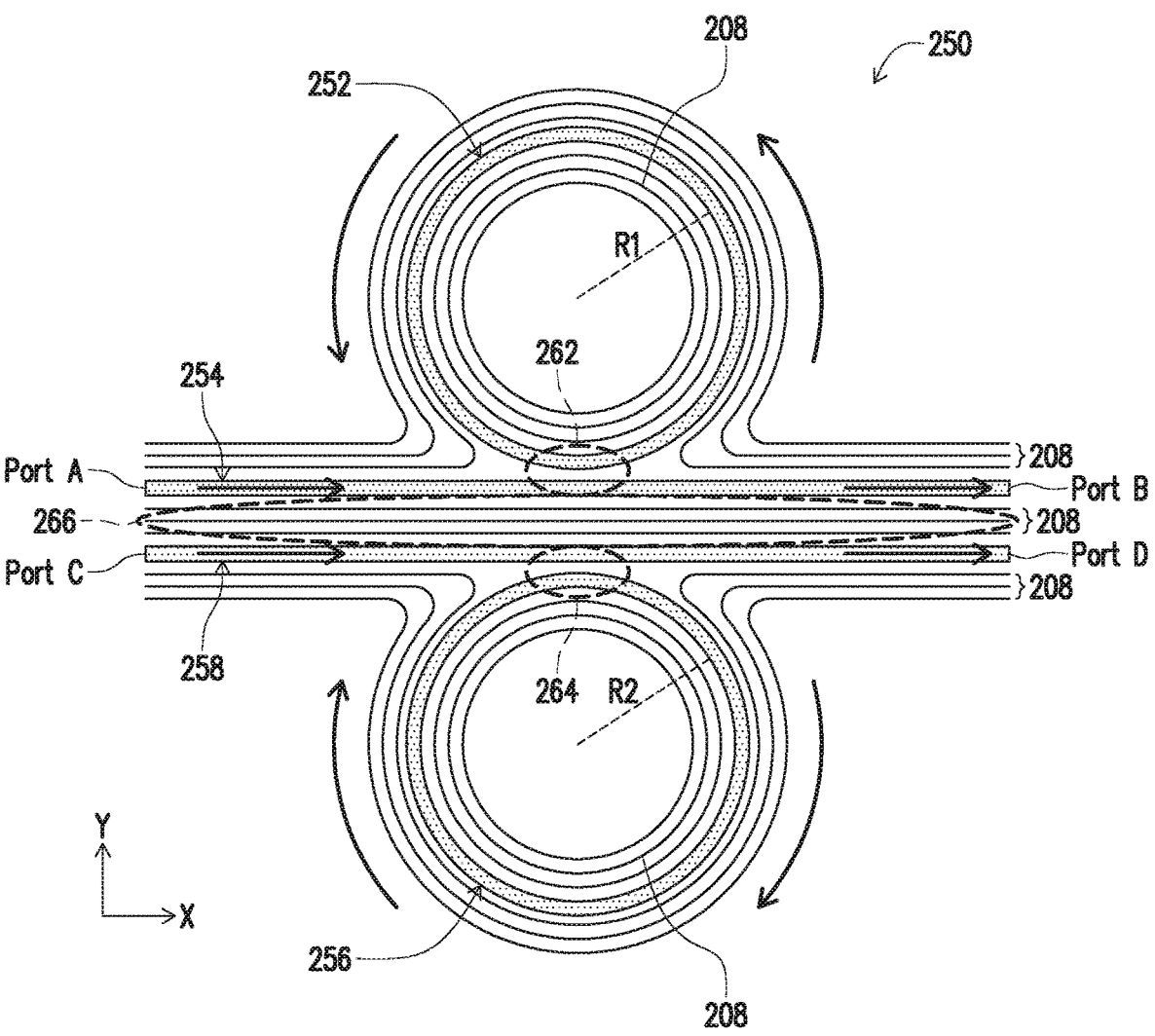
FIGS. 6 and 7 illustrate top views of a photonic structure, constructed according to various embodiments of the present disclosure.

Referring to FIG. 6 in a top view, a photonic structure 250 includes a first ring optical waveguide 252 and a first rail optical waveguide 254 coupled together to form a first ORR, and a second ring optical waveguide 256 and a second rail optical waveguide 258 coupled together to form a second ORR. The first ring optical waveguide 252 is disposed on one side of the first rail optical waveguide 254. The second ring optical waveguide 256 is disposed on one side of the second rail optical waveguide 258. Each pair of the ring optical waveguide and the rail optical waveguide is similar to the photonic structure 200 in FIGS. 5A and 5B in terms of composition, structure, and material composition according to the disclosed embodiments. For examples, the first and second ring optical waveguides 252 and 256, and the first and second rail optical waveguides 254 and 258 each may include a non-linear optical material (such as silicon nitride or other suitable material including $LiNbO_3$, AlGaAs, InP, or AlN) surrounded by a cladding layer (such as silicon dioxide) that is disposed over a semiconductor substrate. Further, the ring optical waveguides and the rail optical waveguides may have different material compositions.

The first rail optical waveguide 254 is in the form of a single rail and provides a path for source (incident) photons from a single photon source or combined photon sources as discussed above. Similarly, the second rail optical waveguide 258 is in the form of a single rail and provides a path for source (incident) photons from a single photon source or combined photon sources as discussed above. The first ring optical waveguide 252 has a radius R1, the second ring optical waveguide 256 has a radius R2, which may be equal to or different from R1.

The two pairs of the ring optical waveguide and rail optical waveguide form two ORR devices disposed next to each other but are intended not to be coupled. The enhancement features 208 are disposed around active optical devices (the ring optical waveguides 252 and 256, and the rail optical waveguides 254 and 258) to suppress the power loss into the space (functioning as suppressor); and additionally disposed between the two pairs of ring optical waveguide and rail optical waveguide to reduce crosstalk (functioning as isolator). Particularly, the enhancement features 208 interposed between the two rail optical waveguides 254 and 258 in the region 266 function both as isolator to reduce crosstalk and as suppressor to reduce power loss. The enhancement features 208 are free from the intended coupling regions 262 and 264. The enhancement features 208 are similar to the enhancement features 208 in FIGS. 5A and 5B in term of composition, number and dimensions. However, the enhancement features 208 functioning as isolator may be configured differently to the enhancement features 208 functioning as suppressor in terms of the numbers of the enhancement features, line width and line pitch such that those enhancement features 208 can be respectively tuned for maximized or optimized performance. Furthermore, the enhancement features 208 functioning as suppressor around the first pair of ring optical waveguide 252 and rail optical waveguide 254 may be configured differently to the enhancement features 208 functioning as suppressor around the second pair of ring optical waveguide 256 and rail optical waveguide 258 in terms of the numbers of the enhancement features, line width and line pitch so those can be individually tuned for maximized or optimized performance.

Figure 7:
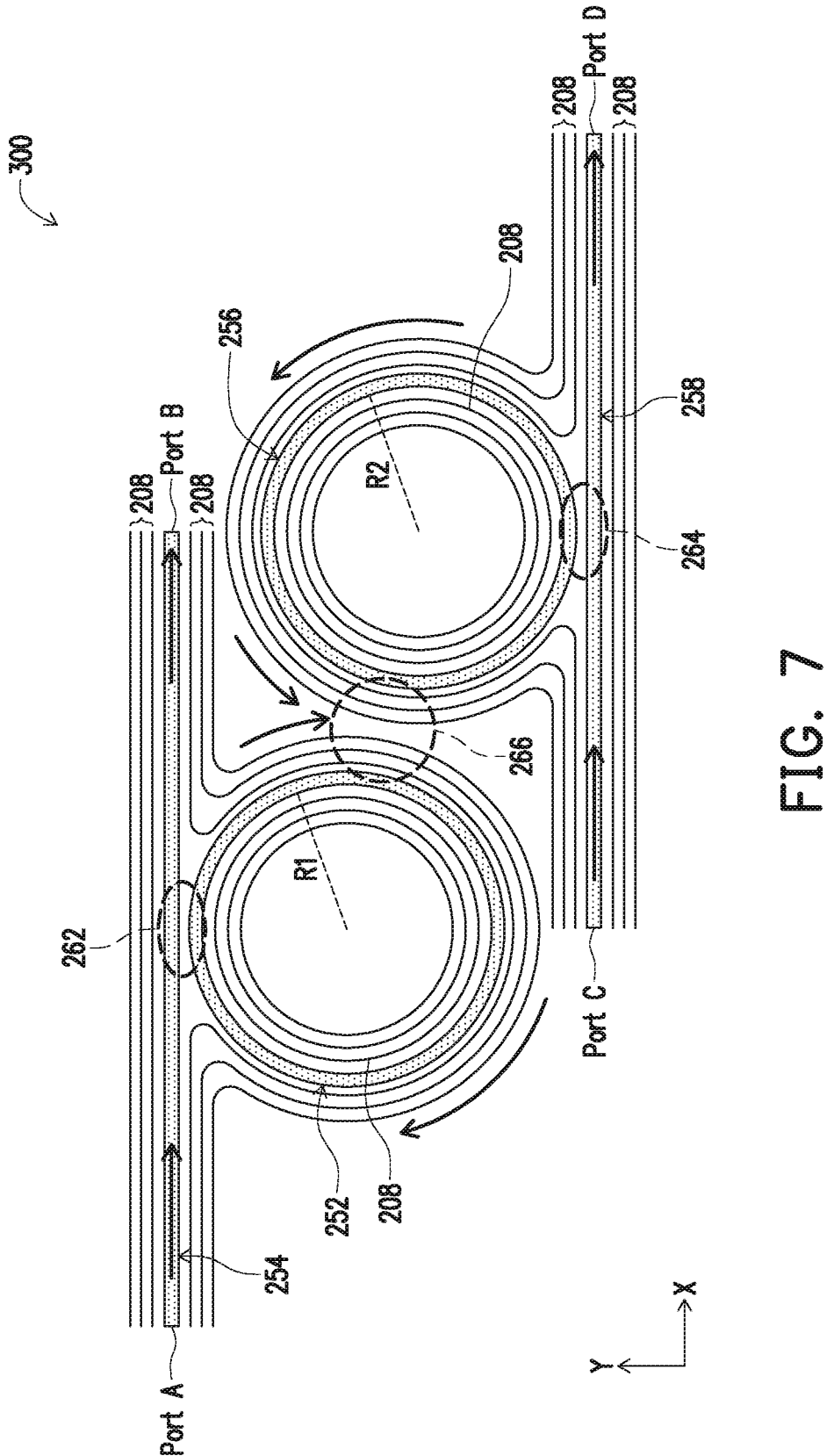

Referring to FIG. 7 in a top view, a photonic structure 300 includes a first ring optical waveguide 252 and a first rail optical waveguide 254 coupled together to form a first ORR, and a second ring optical waveguide 256 and a second rail optical waveguide 258 coupled together to form a second ORR. The photonic structure 300 is similar to the photonic structure 250 in FIG. 6 but is configured differently. Specifically, the first ring optical waveguide 252 is disposed on one side of the first rail optical waveguide 254 and the second ring optical waveguide 256 is disposed on one side of the second rail optical waveguide 258 such that the twos ring optical waveguides 252 and 256 are interposed between the two rail optical waveguides 254 and 258.

Each pair of the ring optical waveguide and the rail optical waveguide integrated as an ORR is similar to the photonic structure 250 in FIG. 6 in terms of structure, and material composition according to the disclosed embodiments. For examples, the first and second ring optical waveguides 252 and 256, and the first and second rail optical waveguides 254 and 258 each may include a non-linear optical material (such as silicon nitride or other suitable material including LiNbO$_3$, AlGaAs, InP, or AlN) surrounded by a cladding layer. Further, the ring optical waveguides and the optical waveguides may have different material compositions.

The first rail optical waveguide 254 is in the form of a single rail and provides a path for source (incident) photons from a single photon source or combined photon sources as discussed above. Similarly, the second rail optical waveguide 258 is in the form of a single rail and provides a path for source (incident) photons from a single photon source or combined photon sources as discussed above. In the disclosed embodiment, the first ring optical waveguide 252 has a radius R1, the second ring optical waveguide 256 has a radius R2, which may be equal to or different from R1.

The two pairs of ring optical waveguide and rail optical waveguide are disposed next each other but are intended not to be coupled. The enhancement features 208 are disposed around active optical devices (the ring optical waveguides 252 and 256, and the rail optical waveguides 254 and 258) to suppress the power loss into the space (functioning as suppressor); and additionally disposed between the two pairs of ring optical waveguide and rail optical waveguide to reduce crosstalk (functioning as isolator). Particularly, the enhancement features 208 interposed between the two ring optical waveguides 252 and 256 in the region 266 function both as isolator to reduce crosstalk and as suppressor to reduce power loss. The enhancement features 208 are free from the intended coupling regions 262 and 264. The enhancement features 208 are similar to the enhancement features 208 in FIGS. 5A and 5B in term of composition. However, the enhancement features 208 functioning as isolator may be configured differently to the enhancement features 208 functioning as suppressor in terms of the numbers of the enhancement features, line width and line pitch so those can be respectively tuned for maximized or optimized performance. Furthermore, the enhancement features 208 functioning as suppressor around the first ring optical waveguide 252 and the first rail optical waveguide 254 may be configured differently to the enhancement features 208 functioning as suppressor around the second ring optical waveguide 256 and the second rail optical waveguide 258 in terms of the numbers of the enhancement features, line width and line pitch so those can be individually tuned for maximized or optimized performance.

Figure 8:
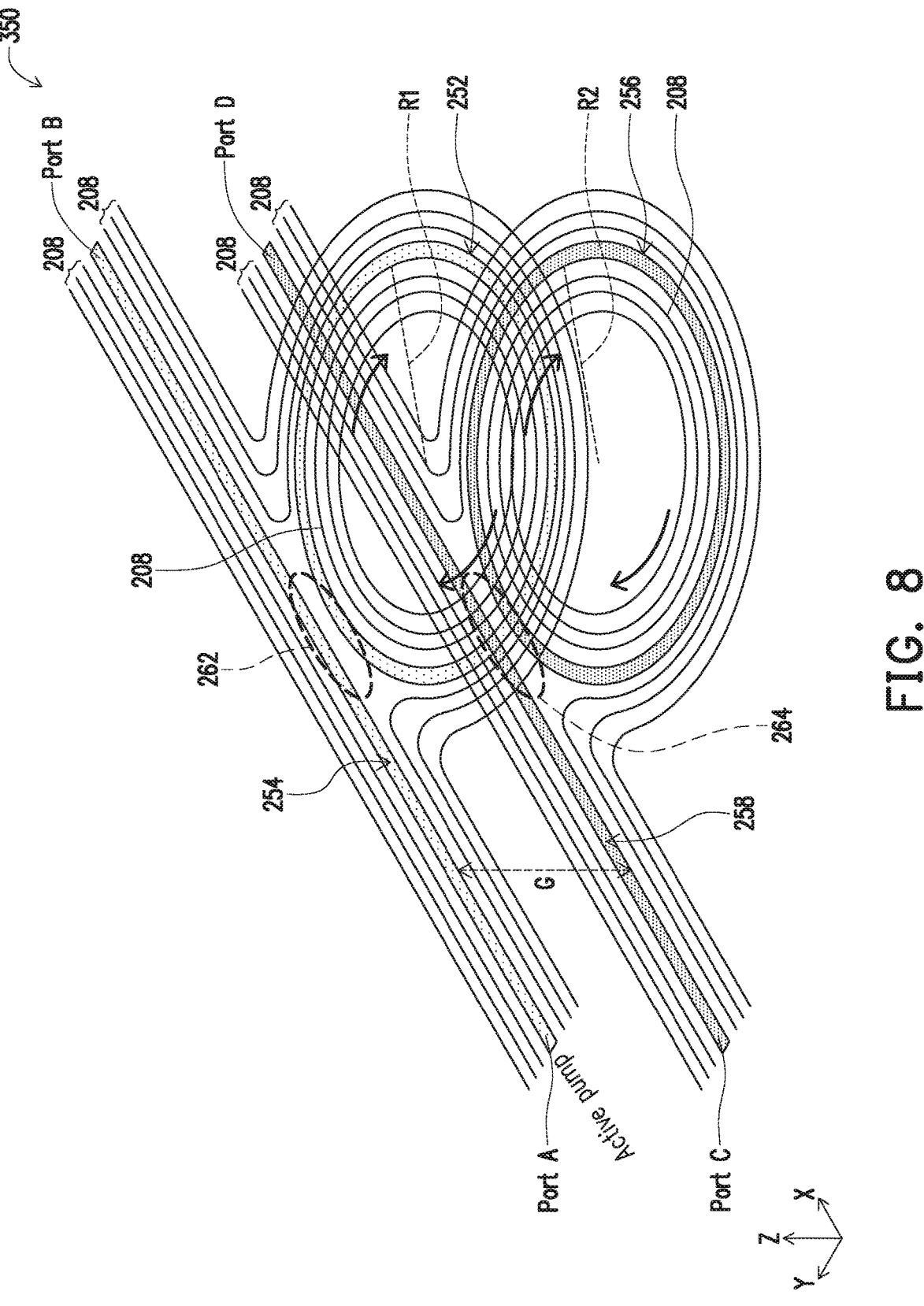
FIGS. 8, 9 and 10 illustrate perspective views of a photonic structure, constructed according to various embodiments of the present disclosure.

Referring to FIG. 8 in a perspective view, a photonic structure 350 includes a first ring optical waveguide 252 and a first rail optical waveguide 254 coupled together to form a first ORR, and a second ring optical waveguide 256 and a second rail optical waveguide 258 coupled together to form a second ORR. The photonic structure 350 is different from the photonic structure 300 in FIG. 7 in various aspects as described below. The first ORR including a pair of ring optical waveguide 252 and the rail optical waveguide 254, and the second ORR including a pair of ring optical waveguide 256 and the rail optical waveguide 258 are configured vertically along Z direction that is perpendicular to the top surface of the substrate 104 with a gap G along Z direction. More particularly, the first pair of the ring optical waveguide 252 and the rail optical waveguide 254 is stacked on the second pair of the ring optical waveguide 256 and the rail optical waveguide 258 over the substrate 104. The gap G is designed to achieve the desired coupling effect. In some embodiments, the gap G ranges between 0.2λ and 0.6λ, where A is the wavelength of the light or working photons.

Each ORR including a ring optical waveguide and a corresponding rail optical waveguide is similar to the photonic structure 300 in FIG. 7 in terms of structure, and material composition according to the disclosed embodiments. For examples, each of the first and second ring optical waveguides 252 and 256, and the first and second rail optical waveguides 254 and 258 may include a non-linear optical material (such as silicon nitride or other suitable material including LiNbO$_3$, AlGaAs, InP, or AlN) surrounded by a cladding layer. Further, the ring optical waveguides and the rail optical waveguides may have different material compositions.

In the disclosed embodiment, the first rail optical waveguide 254 is in the form of a single rail and provides a path for source (incident) photons from a single photon source or combined photon sources as discussed above. The first rail optical waveguide 254 is actively pumped or is connected to an optical photon source as the input. The second rail optical waveguide 258 is not directly connected to any input. In other words, the second ring optical waveguide 256 is a single passive component and is configured to be coupled with the first ring optical waveguide 252 through a vertical spacing between the first and second ORRs. Accordingly, the second ring optical waveguide 256 is also referred to as a single passive co-resonator. The first ring optical waveguide 252 has a radius R1, and the second ring optical waveguide 256 has a radius R2. In some embodiments, R2 is different from R1. In some other embodiments, R2 is equal to R1. In furtherance of the embodiments wherein R1=R2, the first ring optical waveguide 252 and the second ring optical waveguide 256 are aligned, which means the two ring optical waveguides 252 and 256 are overlapped in the top view toward the substrate 104 so that the coupling effect is maximized. This structure is also referred to as a vertical-coupled co-resonator rings. In the disclosed embodiment, the two rail optical waveguides 254 and 258 are configured on the same side of the ring optical waveguides 252 and 256.

The two ORRs are vertical stacked and are designed to be near-field coupled, the space between the two ORRs are free of the enhancement features 208 so that near-field coupling can be achieved. The enhancement features 208 are further free from the near-field coupling regions 262 and 264. The enhancement features 208 are disposed around the ring optical waveguides 252 and 256, and the rail optical waveguides 254 and 258 to suppress the power loss into the space (functioning as suppressor). The design includes two pairs of ring optical waveguides and rail optical waveguides, each surrounded by subsets of enhancement features 208. The first subset is disposed around the first ring optical waveguide 252 and the first rail optical waveguide 254, and is arranged at the same level as the first ring optical waveguide 252 and the first rail optical waveguide 254 along the Z direction. Similarly, the second subset is disposed around the second ring optical waveguide 256 and the second rail optical waveguide 258, and is arranged at the same level as the second ring optical waveguide 256 and the second rail optical waveguide 258 along the Z direction. The structure of each ORR, as well as the corresponding enhancement features 208, resembles the photonic structure 200 shown in FIGS. 5A and 5B.

The enhancement features 208 functioning as suppressor around the first ORR (including the first ring optical waveguide 252 and the first rail optical waveguide 254) may be configured differently to the enhancement features 208 functioning as suppressor around the second ORR (including the second ring optical waveguide 256 and the second rail optical waveguide 258) in terms of the numbers of the enhancement features, line width and line pitch so those can be individually tuned to maximize and optimize the respective functions.

Figure 9:
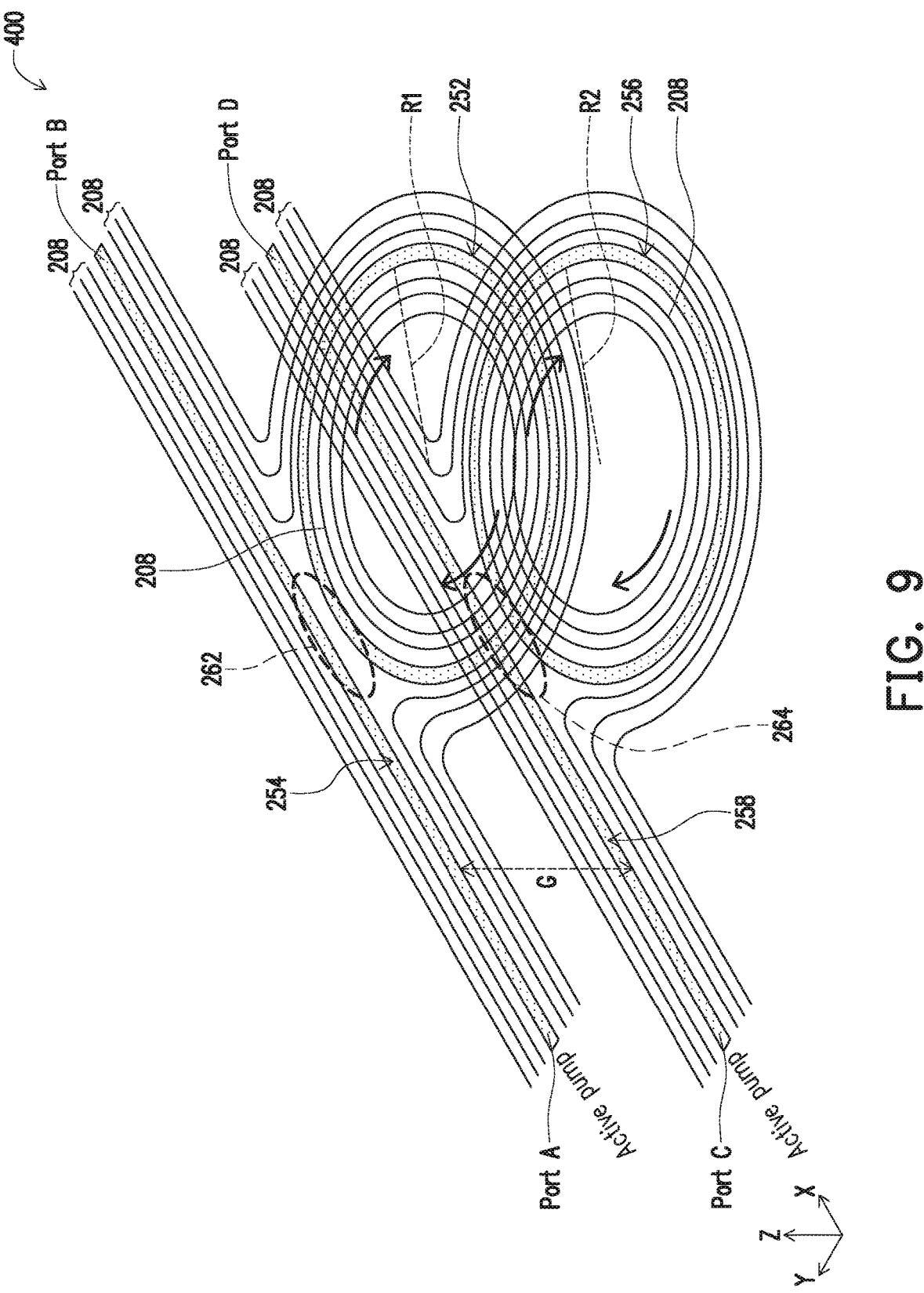

Referring to FIG. 9 in a perspective view, a photonic structure 400 includes a first ring optical waveguide 252 and a first rail optical waveguide 254 coupled together to form a first ORR, and a second ring optical waveguide 256 and a second rail optical waveguide 258 coupled together to form a second ORR. The photonic structure 400 is similar to the photonic structure 350 in FIG. 8, in which two ORRs are vertically stacked along the Z direction with a distance G along the Z direction. More particularly, the first ORR (including the first ring optical waveguide 252 and the first rail optical waveguide 254) is stacked on the second ORR (including the second ring optical waveguide 256 and the second rail optical waveguide 258) over the substrate 104. The distance G is designed to achieve the desired coupling effect. In some embodiments, the gap G ranges between 0.2λ and 0.6λ, where λ is the wavelength of the light or working photons.

However, the photonic structure 400 is different from the photonic structure 350 in FIG. 8. In the photonic structure 400, both ORRs are active, therefore the photonic structure 400 is referred as dual active co-resonator. An optical power is pumped into the input A of the first rail optical waveguide 254 and is coupled to the first ring optical waveguide 252; and another optical power is pumped into the input C of the second rail optical waveguide 258 and is coupled to the second ring optical waveguide 256. The two ORRs are optically coupled vertically through the space therebetween.

The first ORR (including the first ring optical waveguide 252 and the first rail optical waveguide 254), and the second ORR (including the second ring optical waveguide 256 and the second rail optical waveguide 258) are configured vertically along Z direction that is perpendicular to the top surface of the substrate 104. More particularly, the first ORR is stacked on the second ORR over the substrate 104.

Each ORR is similar to the photonic structure 350 in FIG. 8 in terms of structure, and material composition according to the disclosed embodiments. For examples, the first and second ORRs each may include a non-linear optical material (such as silicon nitride or other suitable material including LiNbO₃, AlGaAs, InP, or AlN) surrounded by a cladding layer. Further, the ring optical waveguides and the rail optical waveguides may have different material compositions.

In the disclosed embodiment, the first rail optical waveguide 254 is in the form of a single rail and provides a path for source (incident) photons from a single photon source or combined photon sources as discussed above. The first rail optical waveguide 254 is actively pumped or is connected to an optical source as the input. Similarly, the second rail optical waveguide 258 is actively pumped or is connected to an optical source as the input as well. The second ORR is configured to be further coupled with the first ORR. The first ring optical waveguide 252 has a radius R1, the second ring optical waveguide 256 has a radius R2. In some embodiments, R2 is different from R1. In some embodiments, R2 is equal to R1. In furtherance of the embodiments wherein R1=R2, the first ring optical waveguide 252 and the second ring optical waveguide 256 are aligned, which means the two ring optical waveguides 252 and 256 are overlapped in the top view toward the substrate 104 so that the coupling effect is maximized. In the disclosed embodiment, the two rail optical waveguides 254 and 258 are configured on the same side of the ring optical waveguides 252 and 256.

The two ORRs are vertically stacked and are designed to be near-field coupled, the space between the two ORRs are free of the enhancement features 208 so that near-field coupling can be achieved. The enhancement features 208 are further free from the near-field coupling regions 262 and 264. The enhancement features 208 are disposed around two ORRs to suppress the power loss into the free space (functioning as suppressor). The design includes two ORRs (each including a ring optical waveguide and a rail optical waveguides), each being surrounded by a subset of enhancement features 208. The first subset is disposed around the first ring optical waveguide 252 and the first rail optical waveguide 254, and is arranged at the same level as the first ring optical waveguide 252 and the first rail optical waveguide 254 along the Z direction. Similarly, the second subset is disposed around the second ring optical waveguide 256 and the second rail optical waveguide 258, and is arranged at the same level as the second ring optical waveguide 256 and the second rail optical waveguide 258 along the Z direction. The structure of each ORR and the corresponding enhancement features 208, resembles the photonic structure 200 shown in FIGS. 5A and 5B.

The enhancement features 208 functioning as suppressor around the first ORR (252 and 254) may be configured differently to the enhancement features 208 functioning as suppressor around the second ORR (256 and 258) in terms of the numbers of the enhancement features, line width and line pitch so those can be individually tuned to maximize and optimize respective functions.

Figure 10:
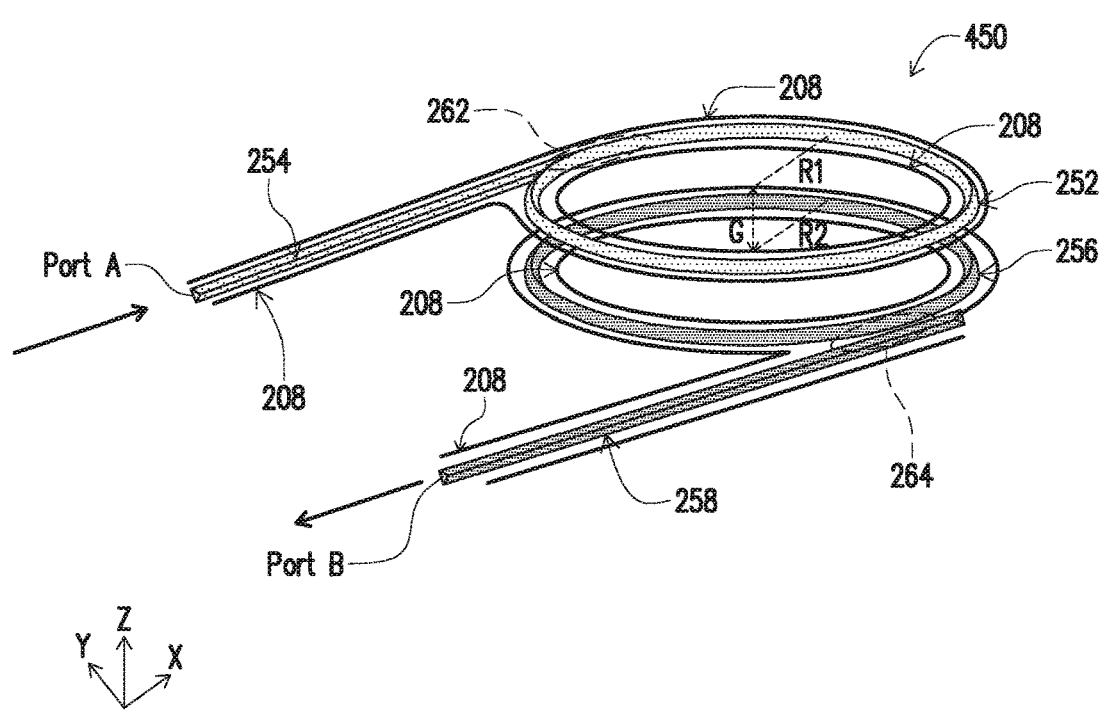

Referring to FIG. 10 in a perspective view, a photonic structure 450 includes a first ring optical waveguide 252 and a first rail optical waveguide 254 coupled together to form a first ORR, and a second ring optical waveguide 256 and a second rail optical waveguide 258 coupled together to form a second ORR. The photonic structure 450 is similar to the photonic structure 350 in FIG. 8, in which two ORRs are vertically stacked along the Z direction with a distance G along the Z direction. More particularly, the first ORR is stacked on the second ORR over the substrate 104. The distance G is designed to achieve the desired coupling effect. In some embodiments, the gap G ranges between 0.2λ and 0.6λ, where λ is the wavelength of the light or working photons.

Each ORR is similar to the photonic structure 350 in FIG. 8 in terms of structure, and material composition according to the disclosed embodiments. For examples, the first and second ring optical waveguides 252 and 256, and the first and second rail optical waveguides 254 and 258 each may include a non-linear optical material (such as silicon nitride or other suitable material including LiNbO$_3$, AlGaAs, InP, or AlN) surrounded by a cladding layer. Further, the ring optical waveguides and the rail optical waveguides may have different material compositions.

Furthermore, in the photonic structure 450, the first ORR is active, and the second ORR is passive, therefore the photonic structure 450 includes a single (or one-side) inject pump drive ring and a passive co-resonator. An optical power is pumped into the input A of the first rail optical waveguide 254 and is coupled to the first ring optical waveguide 252; and another port B of the second rail optical waveguide 258 is coupled to the second ring optical waveguide 256 and is functioning as an output. The two ORRs are optically coupled vertically through the space therebetween with a gap G.

In the disclosed embodiment, the first rail optical waveguide 254 is in the form of a single rail and provides a path for source (incident) photons from a single photon source or combined photon sources as discussed above. The first ring optical waveguide 252 is configured to be coupled with the second ring optical waveguide 256. The first ring optical waveguide 252 has a radius R1, the second ring optical waveguide 256 has a radius R2. In some embodiments, R2 is different from R1. In some embodiments, R2 is equal to R1. In furtherance of the embodiments wherein R1=R2, the first ring optical waveguide 252 and the second ring optical waveguide 256 are aligned, which means the two ring optical waveguides 252 and 256 are overlapped in the top view toward the substrate 104 so that the coupling effect is maximized. In the disclosed embodiment, the two rail optical waveguides 254 and 258 are configured on the opposite sides of the ring optical waveguides 252 and 256 to avoid the coupling between the two rail optical waveguides.

The two ORRs are vertically stacked and are designed to be near-field coupled, and the space between the two ORRs are free of the enhancement features 208 so that near-field coupling can be achieved. The enhancement features 208 are further free from the near-field coupling regions 262 and 264. The enhancement features 208 are disposed around ORRs (including the ring optical waveguides 252 and 256, and the rail optical waveguides 254 and 258) to suppress the power loss into the free space (functioning as suppressor).

However, the photonic structure 450 is different from the photonic structure 350 in FIG. 8 in various aspects of the design layout. Firstly, the first ring optical waveguide 252 and the second ring optical waveguide 256 are aligned along Z direction and are substantially aligned or completely aligned if R$_1$=R$_2$. The first rail optical waveguide 254 and the second rail optical waveguide 258 are placed on opposite sides of the ring optical waveguides 252 and 256 so to reduce the directly coupling between the two rail optical waveguides 254 and 258.

Secondly, the photonic structure 450 includes two ORRs each being surrounded by a subset of enhancement features 208. The first subset is disposed around the first ring optical waveguide 252 and the first rail optical waveguide 254, and is arranged at the same level as the ring optical waveguide 252 and the rail optical waveguide 254 along the Z direction. Similarly, the second subset is disposed around the second ring optical waveguide 256 and the second rail optical waveguide 258, and is arranged at the same level as the ring optical waveguide 256 and the rail optical waveguide 258 along the Z direction. The enhancement features 208 are designed with different structure and configuration. For example, the number of the enhancement features 208, and the spacing between the ORR and the corresponding enhancement features 208 may be different.

Various coupling effects may be achieved through near-field coupling or alternatively through direct coupling where the ring optical waveguide and the corresponding rail optical waveguide are connected (merged) without gap. The direct coupling is more efficient and less power loss. In some embodiments, the first rail optical waveguide 254 and the first ring optical waveguide 252 are directly coupled; and the second rail optical waveguide 258 and the second ring optical waveguide 256 are coupled through near-field.

Figure 11A:
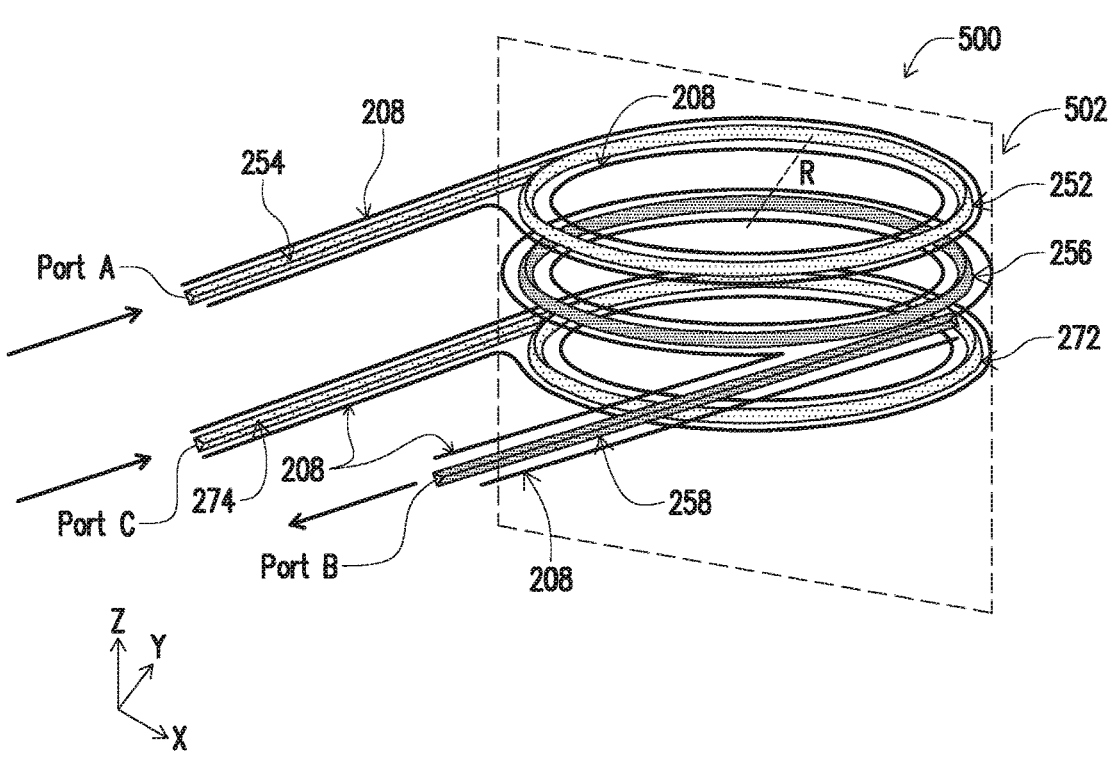
FIGS. 11A, 11B and 11C illustrate a perspective view, a sectional view, and a top view, respectively, of a photonic structure, in portion, constructed according to some embodiments of the present disclosure.
Figure 11B:
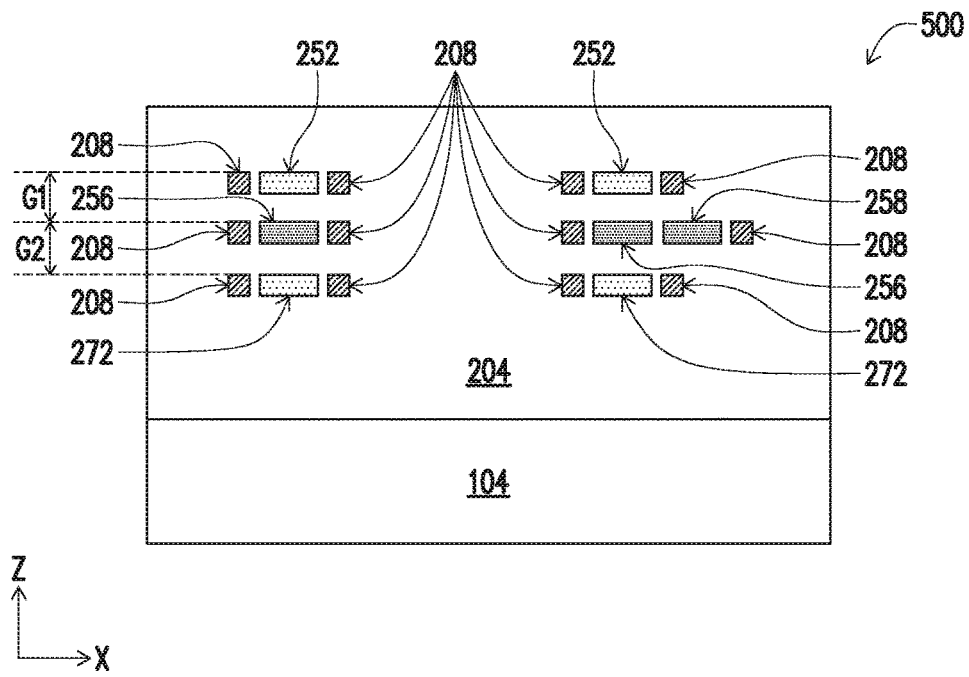

FIG. 11A is a perspective view and FIG. 11B is a cross-sectional view of a photonic structure 500 along a X-Y plane 502, constructed in accordance with some embodiments. Referring to FIGS. 11A and 11B, the photonic structure 500 includes three ORRs vertically stacked. Similar to the photonic structure 450 of FIG. 10, the photonic structure 500 includes a first ring optical waveguide 252 and a first rail optical waveguide 254 coupled together to form a first ORR, and a second ring optical waveguide 256 and a second rail optical waveguide 258 coupled together to form a second ORR. More particularly, the first ORR is stacked on the second ORR over the substrate 104. The distance G1 is designed to achieve the desired coupling effect. In some embodiments, the gap G1 ranges between 0.2λ and 0.6λ, where λ is the wavelength of the light or working photons.

The photonic structure 500 further includes a third ring optical waveguide 272 and a third rail optical waveguide 274 coupled together through the near field coupling to form a third ORR. The third ORR is disposed on the substrate 104 and underlying the second ORR with the vertical distance G2 along Z direction. The distance H2 is designed to achieve the desired coupling effect. In some embodiments, the gap G2 ranges between 0.2λ and 0.6λ, where λ is the wavelength of the light or working photons.

In the disclosed embodiment, the first ring optical waveguide 252 is a directly-injected active pump ring; the second ring optical waveguide 256 is a passive ring; and the third ring optical waveguide 272 is a directly-injected active pump ring. Particularly, a first optical source is pumped into the first rail optical waveguide 254 through the first port A and is coupled to the first ring optical waveguide 252 through near-field coupling. A second optical source is pumped into the third rail optical waveguide 274 through the third port C and is coupled to the third ring optical waveguide 272 through near-field coupling.

Thus, the photonic structure 500 is a dual (two-sides) inject-pump drive ring with a sandwiched passive co-resonator. More specifically, a first optical signal is pumped into the first rail optical waveguide 254 from Port A and is coupled to the first ring optical waveguide 252 through near-field coupling; a second optical signal is pumped into the third rail optical waveguide 274 from Port C and is coupled to the third ring optical waveguide 272 through near-field coupling. The first optical signal is processed by the first ring optical waveguide 252 and is further coupled to the passive co-resonator (the second ring optical waveguide 256) through a vertical near-field spacing; and the second optical signal is processed by the third ring optical waveguide 272 and is further coupled to the passive co-resonator (the second ring optical waveguide 256) through a vertical near-field spacing. The first and second optical signals are combined in the co-resonator and generate an output into the port B.

The configuration of the first and second ORRs is similar to the two ORRs in the photonic structure 450 in FIG. 10 in terms of structure, and material composition according to the disclosed embodiments. For examples, the first and second ring optical waveguides 252 and 256, and the first and second rail optical waveguides 254 and 258 each may include a non-linear optical material (such as silicon nitride or other suitable material including $LiNbO_3$, AlGaAs, InP, or AlN) surrounded by a cladding layer. Further, the ring optical waveguides and the rail optical waveguides may have different material compositions.

Various coupling effects are achieved through near-field coupling or alternatively through direct coupling where the ring optical waveguide and the corresponding rail optical waveguide are connected (merged) without gap. In the disclosed embodiments, the first rail optical waveguide 254 and the first ring optical waveguide 252 are directly coupled; the third rail optical waveguide 274 and the third ring optical waveguide 272 are directly coupled; and the second rail optical waveguide 258 and the second ring optical waveguide 256 are coupled through near-field, as illustrated in FIG. 11B.

Figure 11C:
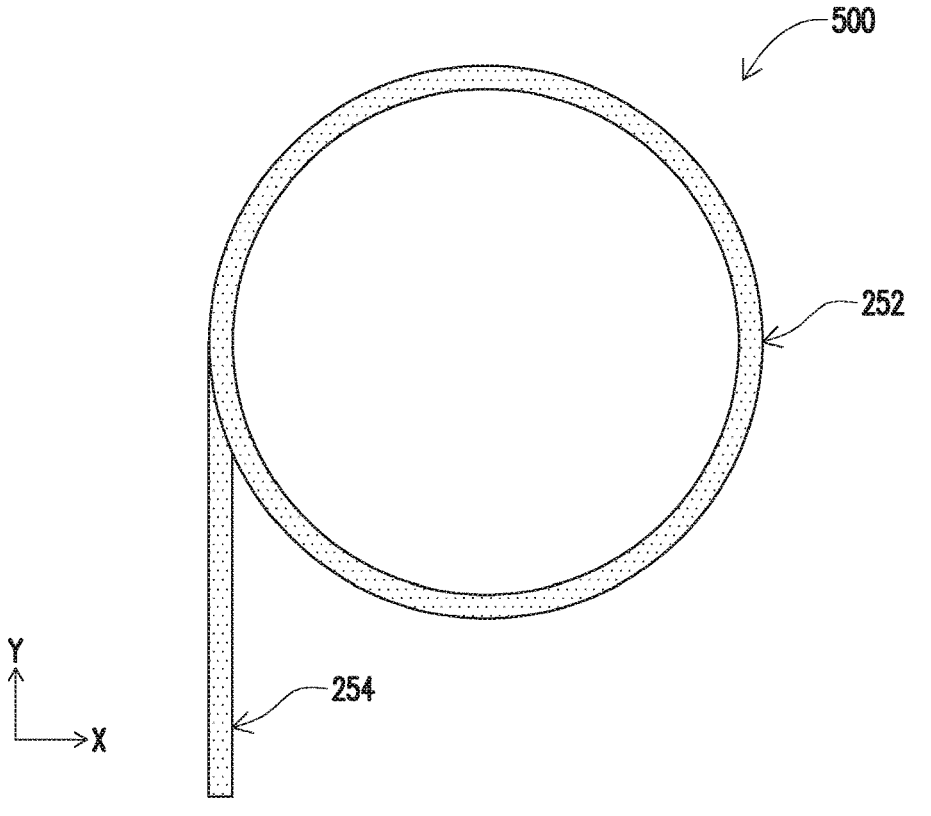

Direct coupling is further illustrated in FIG. 11C in a top view constructed according to some embodiments. Only portions of the photonic structure 500 is illustrated in FIG. 11C. Specifically, only the first ring optical waveguide 252 and the first rail optical waveguide 254 are illustrated for better understanding direct coupling.

In the disclosed embodiment, the three ring optical waveguides (252, 256, and 272) are designed with a same radius R, are vertically stacked, and are fully aligned along Z direction to achieve the maximized or desired coupling effect.

The photonic structure 500 includes three ORRs, each being surrounded by a subset of enhancement features 208. The first subset is disposed around the first ring optical waveguide 252 and the first rail optical waveguide 254, and is arranged at the same level as the ring optical waveguide 252 and the rail optical waveguide 254 along the Z direction. Similarly, the second subset is disposed around the second ring optical waveguide 256 and the second rail optical waveguide 258, and is arranged at the same level as the ring optical waveguide 256 and the rail optical waveguide 258 along the Z direction. The third subset is disposed around the third ring optical waveguide 272 and the third rail optical waveguide 274, and is arranged at the same level as the ring optical waveguide 272 and the rail optical waveguide 274 along the Z direction. The enhancement features 208 may be designed with different structure and configuration. For example, the number of the enhancement features 208, and the spacing between the enhancement features 208 and the corresponding ORR may be tuned individually with different values.

Figure 12:
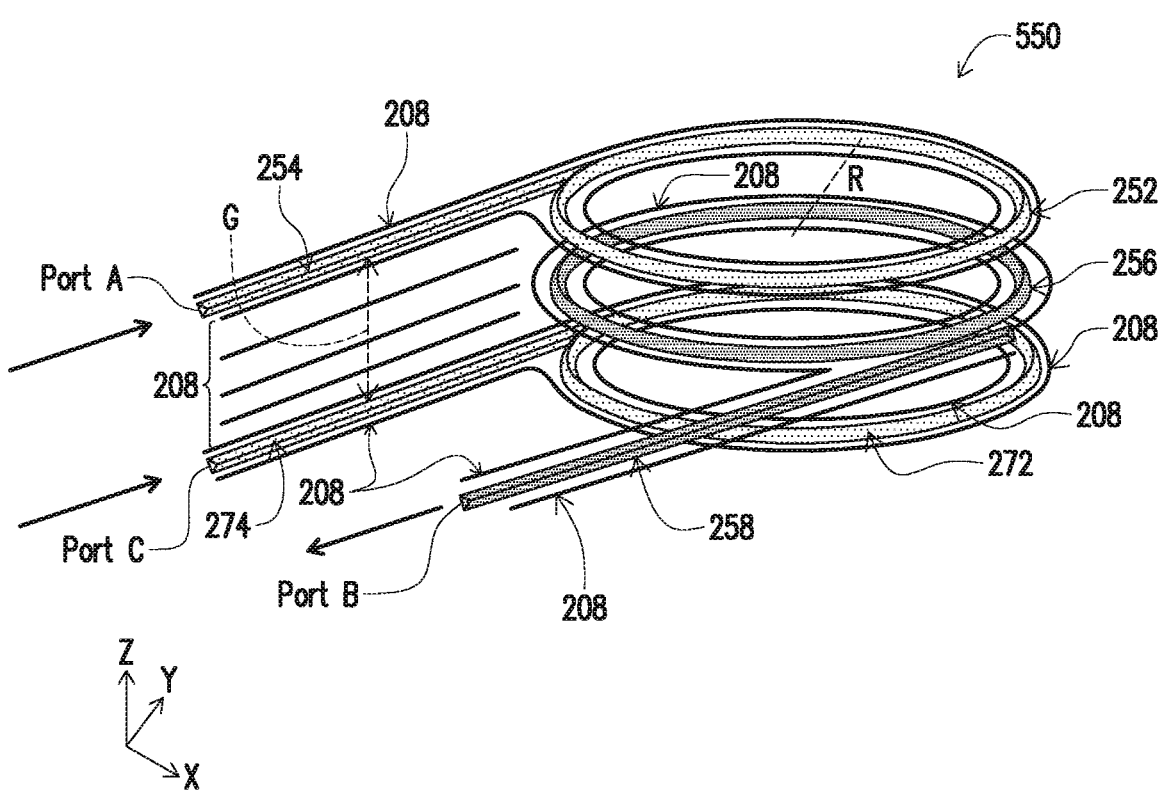
FIG. 12 illustrates a perspective view of a photonic structure, constructed according to some embodiments of the present disclosure.

FIG. 12 is a perspective view of a photonic structure 550 constructed in accordance with some embodiments. The photonic structure 550 is similar to the photonic structure 500 in FIGS. 11A-11C but includes an additional subset (also referred to as a fourth subset) of the enhancement features 208 inserted in the vertical spacing between the rail optical waveguides 254 and 274 to provide additional isolation therebetween and to reduce the interference therebetween. Those enhancement features 208 are free from the vertical space between the ring optical waveguides 252 and 256 and the vertical space between the ring optical waveguides 256 and 272 since those ring optical waveguides are intended to be coupled. Those fourth subset of the enhancement features 208 are vertically distanced and aligned with the rail optical waveguides 254 and 274.

The additional subset of the enhancement features 208 may be different from other enhancement features 208 in terms of number, width, and pitch. In some embodiments, the gap G between the rail optical waveguides 254 and 274 ranges between $0.2\lambda$ and $0.6\lambda$, where $\lambda$ is the wavelength of the light, such as 1550 nm for C-band. In some embodiments for the fourth subset of the enhancement features 208, the pitch P2 ranges between $0.06\lambda$ and $0.12\lambda$; the width W2 ranges between 0.4P2 and 0.7P2; and the spacing S2=P2−W2.

The present disclosure provides a photonic e structure and a method making the same in accordance with various embodiments. The photonic structure includes one or more ORR each having one ring optical waveguide and one rail optical waveguides coupled together through near-field coupling or direct coupling. The enhancement features are configured around ORRs to reduce power loss and/or reduce crosstalk, enhancing the performance of the photonic structure accordingly and also reducing the device footprint as various waveguides can be disposed more closely without interference. In some embodiments, the ORRs are configured next to each other at a same level over the substrate; and the enhancement features are further configured between the ORRs to reduce the crosstalk. In some embodiments, the ORRs are disposed at different level over the substrate and configured to be aligned to achieve near-field coupling through the vertical direction; and the enhancement features are free from the vertical spacing between the corresponding optical ring.

In one aspect, the present disclosure provides an embodiment of a photonics structure that includes a ring optical waveguide on a substrate; a rail optical waveguide configured to couple a light into the ring optical waveguide; and enhancement features configured around the ring optical waveguide and the rail optical waveguide to enhance the photonic structure.

In another aspect, the present disclosure provides an embodiment of a photonics structure that includes a first ring optical waveguide on a substrate; a first rail optical waveguide configured to couple a first light into the first ring optical waveguide; first enhancement features configured around the first ring optical waveguide and the first rail optical waveguide; a second ring optical waveguide on the substrate; a second rail optical waveguide configured to couple a second light into the second ring optical waveguide; and second enhancement features configured around the second ring optical waveguide and the second rail optical waveguide. The first ring optical waveguide, the first rail optical waveguide and the first enhancement features are positioned at a first level over the substrate. The second ring optical waveguide, the second rail optical waveguide and the second enhancement features are positioned at a second level over the substrate, and the second level is different from the first level.

In yet another aspect, the present disclosure provides an embodiment of a photonics structure. The photonics structure includes a first optical ring resonator on a substrate at a first level, a second optical ring resonator on the substrate at a second level, and a third optical ring resonator on the substrate at a third level. The first optical ring resonator further includes a first ring optical waveguide, a first rail optical waveguide configured to couple a first light into the first ring optical waveguide, and first enhancement features configured around the first ring optical waveguide and the first rail optical waveguide. The second optical ring resonator further includes a second ring optical waveguide, a second rail optical waveguide configured to couple a second light into the second ring optical waveguide, and second enhancement features configured around the second ring optical waveguide and the second rail optical waveguide. The third optical ring resonator further includes a third ring optical waveguide, a third rail optical waveguide configured to couple a third light into the third ring optical waveguide, and third enhancement features configured around the third ring optical waveguide and the third rail optical waveguide. The first, second and third levels are different from each other. The first, second and third ring optical waveguides are vertically aligned. The first, second and third enhancement features have a width less than that of the first, second, and third ring optical waveguides.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A photonics structure, comprising:
a ring optical waveguide on a substrate;
a rail optical waveguide configured to couple a light into the ring optical waveguide; and
enhancement features configured around the ring optical waveguide and the rail optical waveguide to enhance the photonic structure, wherein the enhancement features each include an optical waveguide to suppress optical radiation loss from the ring optical waveguide and the rail optical waveguide.

2. The photonics structure of claim 1, wherein the rail optical waveguide, the ring optical waveguide and the enhancement features are formed on a semiconductor substrate at a same level over the semiconductor substrate.

3. The photonic structure of claim 1, wherein the rail optical waveguide, the ring optical waveguide and the enhancement features include a same material surrounded by a cladding material.

4. The photonic structure of claim 3, wherein the cladding material includes silicon oxide.

5. The photonic structure of claim 1, wherein the ring optical waveguide includes a nonlinear material selected from the group consisting of silicon nitride (SiN), lithium niobate (LiNbO$_3$), aluminium gallium arsenide (AlGaAs), Indium phosphide (InP), aluminum nitride (AlN), and a combination thereof.

6. The photonic structure of claim 1, wherein the enhancement features include
a first subset surrounding outside of the ring optical waveguide and extended on a first edge of the rail optical waveguide;
a second subset configured inside of the ring optical waveguide; and
a third subset configured on a second edge of the rail optical waveguide.

7. The photonic structure of claim 6, wherein the enhancement features include a width less than a width of the rail optical waveguide and the ring optical waveguide.

8. The photonic structure of claim 6, wherein
the ring optical waveguide and the rail optical waveguide include a first width ranging between 0.2λ and 2λ; and
the enhancement features include a second width ranging between 0.03λ and 0.09λ, wherein λ is the wavelength of the light.

9. The photonic structure of claim 6, wherein each subset of the enhancement features includes a number N of the enhancement features, and wherein the number N ranges between 1 and 5.

10. The photonic structure of claim 1, wherein
each subset of the enhancement features is arranged in a periodic configuration with a pitch P ranging between 0.06λ and 0.12λ, a width W ranging between 0.4P and 0.7P, and a spacing S=P−W; and
λ is the wavelength of the light.

11. The photonic structure of claim 1, wherein the enhancement features are free from a spacing between the ring optical waveguide and the rail optical waveguide.

12. The photonic structure of claim 1, wherein the ring optical waveguide is a first ring optical waveguide, the rail optical waveguide is a first rail optical waveguide, the enhancement features are first enhancement features, and the light is a first light, the photonic structure further includes
a second ring optical waveguide;
a second rail optical waveguide configured to couple a second light into the second ring optical waveguide; and
second enhancement features configured around the second ring optical waveguide and the second rail optical waveguide to enhance the photonic structure.

13. The photonic structure of claim 12, wherein
the first ring optical waveguide, the first rail optical waveguide and the first enhancement features are positioned at a first level over the substrate; and the second ring optical waveguide, the second rail optical waveguide and the second enhancement features are positioned at a second level over the substrate.

14. The photonic structure of claim 13, wherein the first and second levels are same; and the first ring optical waveguide and the first rail optical waveguide are separated from the second ring optical waveguide and the second rail optical waveguide by the first and second enhancement features.

15. The photonic structure of claim 13, wherein the first and second levels are different; and the first and second ring optical waveguides are vertically aligned over the substrate and are optically coupled.

16. The photonic structure of claim 15, further comprising:

a third ring optical waveguide;

a third rail optical waveguide configured to couple a third light into the third ring optical waveguide; and third enhancement features configured around the third ring optical waveguide and the third rail optical waveguide to enhance the photonic structure, wherein the third ring optical waveguide, the third rail optical waveguide, and the third enhancement features are positioned at a third level over the substrate, and the third level is different from the first and second levels.

17. A photonics structure, comprising:

a first ring optical waveguide on a substrate;

a first rail optical waveguide configured to couple a first light into the first ring optical waveguide;

first enhancement features configured around the first ring optical waveguide and the first rail optical waveguide;

a second ring optical waveguide on the substrate;

a second rail optical waveguide configured to couple a second light into the second ring optical waveguide; and second enhancement features configured around the second ring optical waveguide and the second rail optical waveguide, wherein the first ring optical waveguide, the first rail optical waveguide and the first enhancement features are positioned at a first level over the substrate, the second ring optical waveguide, the second rail optical waveguide and the second enhancement features are positioned at a second level over the substrate, and the second level is different from the first level, wherein the first and second enhancement features each include an optical waveguide to suppress optical radiation loss from corresponding one of the first and second ring optical waveguide and the first and second rail optical waveguide.

18. The photonics structure of claim 17, wherein the first and second ring optical waveguides includes a nonlinear material selected from the group consisting of silicon nitride (SiN), lithium niobate (LiNbO$_3$), aluminium gallium arsenide (AlGaAs), Indium phosphide (InP), aluminum nitride (AlN), and a combination thereof.

19. The photonic structure of claim 17, wherein the first enhancement features include a first subset surrounding outside of the first ring optical waveguide and extended on a first edge of the first rail optical waveguide, a second subset configured inside of the first ring optical waveguide, and a third subset configured on a second edge of the first rail optical waveguide; and the second enhancement features include a fourth subset surrounding outside of the second ring optical waveguide and extended on a first edge of the second rail optical waveguide, a fifth subset configured inside of the second ring optical waveguide, and a sixth subset configured on a second edge of the second rail optical waveguide.

20. A photonics structure, comprising:

a first optical ring resonator on a substrate at a first level, wherein the first optical ring resonator further includes a first ring optical waveguide, a first rail optical waveguide configured to couple a first light into the first ring optical waveguide, and first enhancement features configured around the first ring optical waveguide and the first rail optical waveguide;

a second optical ring resonator on the substrate at a second level, wherein the second optical ring resonator further includes a second ring optical waveguide, a second rail optical waveguide configured to couple a second light into the second ring optical waveguide, and second enhancement features configured around the second ring optical waveguide and the second rail optical waveguide; and a third optical ring resonator on the substrate at a third level, wherein the third optical ring resonator further includes a third ring optical waveguide, a third rail optical waveguide configured to couple a third light into the third ring optical waveguide, and third enhancement features configured around the third ring optical waveguide and the third rail optical waveguide, wherein the first, second and third levels are different from each other, the first, second and third ring optical waveguides are vertically aligned, the first, second and third enhancement features each include an optical waveguide to suppress optical radiation loss from corresponding one of the first, second and third ring optical waveguides and the first, second and third rail optical waveguide, and the first, second and third enhancement features have a width less than that of the first, second, and third ring optical waveguides.

* * * * *